(12) United States Patent  
Miller et al.

(10) Patent No.: US 12,502,975 B2
(45) Date of Patent: Dec. 23, 2025

(54) VEHICLE WITH BRAKING MODES

(71) Applicant: Oshkosh Corporation, Oshkosh, WI (US)

(72) Inventors: Amanda Miller, Oshkosh, WI (US); Ryan Wolf, Oshkosh, WI (US); Brendan Chan, Oshkosh, WI (US); Jeff Verhagen, Oshkosh, WI (US); Jeremy Andringa, Oshkosh, WI (US); Jon Branson, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 98 days.

(21) Appl. No.: 18/170,875

(22) Filed: Feb. 17, 2023

(65) Prior Publication Data

US 2023/0311666 A1   Oct. 5, 2023

Related U.S. Application Data

(60) Provisional application No. 63/325,669, filed on Mar. 31, 2022.

(51) Int. Cl.
  *B60L 7/18* (2006.01)

(52) U.S. Cl.
  CPC ............ *B60L 7/18* (2013.01); *B60L 2200/40* (2013.01)

(58) Field of Classification Search
  CPC ............................. B60L 7/18; B60L 2200/40
  USPC ........................................................ 701/22
  See application file for complete search history.

(56) References Cited

U.S. PATENT DOCUMENTS

| 9,056,556 B1* | 6/2015 | Hyde | B60L 58/20 |
| 9,079,505 B1* | 7/2015 | Hyde | G08G 1/202 |
| 10,745,013 B1* | 8/2020 | Herhusky | F02D 33/006 |
| 2004/0002794 A1 | 1/2004 | Pillar et al. | |

(Continued)

FOREIGN PATENT DOCUMENTS

| CA | 3079839 A1 * | 11/2020 | B65F 3/043 |
| CA | 3224358 A1 * | 1/2023 | B65F 3/02 |

(Continued)

OTHER PUBLICATIONS

Rizzoni, Giorgio, and Huei Peng. Hybrid and Electrified Vehicles: The Role of Dynamics and Control. vol. 135. New York: American Society of Mechanical Engineers, 2013. Print. (Year: 2013).*

(Continued)

*Primary Examiner* — Russell Frejd
*Assistant Examiner* — Keith A von Volkenburg
(74) *Attorney, Agent, or Firm* — Foley & Lardner LLP

(57) ABSTRACT

A refuse vehicle includes control system that includes processing circuitry configured to obtain a speed of the refuse vehicle, or an indication of activation of a lift apparatus of the refuse vehicle. The processing circuitry is configured to transition the refuse vehicle between a collection mode of operation and a highway mode of operation based on at least one of the speed of the refuse vehicle or the indication of activation of the lift apparatus of the refuse vehicle. The processing circuitry is configured to operate the refuse vehicle according to the collection mode of operation or the highway mode of operation, wherein the collection mode of operation and the highway mode of operation each comprise different braking settings for the refuse vehicle.

20 Claims, 18 Drawing Sheets

(56) References Cited

U.S. PATENT DOCUMENTS

| | | | |
|---|---|---|---|
| 2005/0095096 A1* | 5/2005 | Curotto | B65F 1/122 |
| | | | 414/406 |
| 2005/0113996 A1 | 5/2005 | Pillar et al. | |
| 2005/0234622 A1 | 10/2005 | Pillar et al. | |
| 2008/0114513 A1 | 5/2008 | Pillar et al. | |
| 2011/0224858 A1* | 9/2011 | Bissontz | B60K 28/165 |
| | | | 180/65.265 |
| 2015/0210313 A1 | 7/2015 | Sears et al. | |
| 2019/0011912 A1* | 1/2019 | Lockwood | G05D 1/0231 |
| 2019/0276102 A1 | 9/2019 | Zuleger et al. | |
| 2019/0325220 A1* | 10/2019 | Wildgrube | B65F 3/048 |
| 2019/0389450 A1* | 12/2019 | Sujan | B60W 10/023 |
| 2021/0121340 A1 | 4/2021 | Malcolm et al. | |
| 2021/0138876 A1* | 5/2021 | Vanous | H02J 7/00036 |
| 2021/0171137 A1 | 6/2021 | Zuleger et al. | |
| 2021/0237588 A1* | 8/2021 | Jablon | B60L 15/2045 |
| 2021/0276423 A1 | 9/2021 | Lombardo et al. | |
| 2021/0276643 A1 | 9/2021 | Ellifson et al. | |
| 2021/0276847 A1 | 9/2021 | Neubauer et al. | |
| 2021/0276848 A1 | 9/2021 | Miller et al. | |
| 2021/0291803 A1* | 9/2021 | Gesang | B60W 10/08 |
| 2021/0292086 A1 | 9/2021 | Mahan et al. | |
| 2021/0323763 A1 | 10/2021 | Koga et al. | |
| 2021/0323764 A1 | 10/2021 | Koga et al. | |
| 2021/0323765 A1 | 10/2021 | Koga et al. | |
| 2021/0325529 A1* | 10/2021 | Koga | B65F 3/02 |
| 2021/0325911 A1 | 10/2021 | Koga et al. | |
| 2021/0345062 A1 | 11/2021 | Koga et al. | |
| 2021/0366208 A1* | 11/2021 | Ikushima | G07C 5/006 |
| 2021/0369515 A1 | 12/2021 | Malcolm et al. | |
| 2021/0373560 A1 | 12/2021 | Koga et al. | |
| 2021/0387528 A1* | 12/2021 | Thompson | B60L 1/00 |
| 2021/0403006 A1* | 12/2021 | Books | B60W 50/10 |
| 2022/0000686 A1 | 1/2022 | Malcolm et al. | |
| 2022/0033181 A1 | 2/2022 | Koga et al. | |
| 2022/0034273 A1* | 2/2022 | Mohammed | F02D 33/006 |
| 2022/0097527 A1 | 3/2022 | Koga et al. | |
| 2022/0097961 A1 | 3/2022 | Koga et al. | |
| 2022/0097964 A1 | 3/2022 | Koga et al. | |
| 2022/0118854 A1 | 4/2022 | Davis et al. | |
| 2022/0135385 A1 | 5/2022 | Lombardo et al. | |
| 2022/0185582 A1 | 6/2022 | Koga et al. | |
| 2022/0204332 A1 | 6/2022 | Miller et al. | |
| 2022/0211560 A1 | 7/2022 | Malcolm et al. | |
| 2022/0234873 A1 | 7/2022 | Miller et al. | |
| 2023/0002152 A1 | 1/2023 | Koga et al. | |
| 2023/0070279 A1 | 3/2023 | Wheeler et al. | |
| 2023/0070769 A1 | 3/2023 | Wheeler et al. | |
| 2023/0074504 A1 | 3/2023 | Ellifson et al. | |

FOREIGN PATENT DOCUMENTS

| | | | | |
|---|---|---|---|---|
| CN | 110949140 A | * | 4/2020 | B60W 20/00 |
| DE | 102018102134 A1 | * | 11/2018 | B62B 3/12 |

OTHER PUBLICATIONS

Zhang, Yi. "The Application of Regenerative Braking System to the Commercial Hybrid Vehicles with All-Wheel Drive System." ProQuest Dissertations & Theses, 2017. Print. (Year: 2017).*

Echter, Nicholas. "Parallel Hydraulic Pressure Assist/Work Circuit Hybrids for Automated Side Loader Refuse Vehicles." ProQuest Dissertations & Theses, 2012. Print. (Year: 2012).*

Giorgio Rizzoni and Huei Peng. Hybrid and Electrified Vehicles: The Role of Dynamics and Control. vol. 135. NewYork: American Society of Mechanical Engineers, 2013. Print. (Year: 2013).* https://info.macktrucks.com/refuse-revolution; "Welcome to the refuse revolution. Mack LR Electric." Retrieved on Mar. 21, 2023.

https://www.youtube.com/watch?v=NQFtAnm7D-c; "All-New Mack LR Electric Garbage Truck." Retrieved on Mar. 21, 2023.

* cited by examiner

VEHICLE WITH BRAKING MODES

CROSS-REFERENCE TO RELATED PATENT APPLICATION

This application claims the benefit of and priority to U.S. Provisional Application No. 63/325,669, filed Mar. 31, 2022, the entire disclosure of which is incorporated by reference herein.

BACKGROUND

The present disclosure relates generally to vehicles. More specifically, the present disclosure relates to different modes of operation of a vehicle.

SUMMARY

One implementation of the present disclosure relates to a refuse vehicle, according to some embodiments. In some embodiments, the refuse vehicle includes a battery, multiple tractive elements, an electrified axle, and a control system. The electrified axle is configured to consume electrical energy from the battery and drive the tractive elements to transport the refuse vehicle, according to some embodiments. In some embodiments, the control system includes processing circuitry. In some embodiments, the processing circuitry is configured to obtain a speed of transport of the refuse vehicle or an indication of activation of a lift apparatus of the refuse vehicle. In some embodiments, the processing circuitry is configured to transition the refuse vehicle between a collection mode of operation and a highway mode of operation based on at least one of the speed of transport of the refuse vehicle or the indication of activation of the lift apparatus of the refuse vehicle. In some embodiments, the processing circuitry is configured to operate the refuse vehicle according to the collection mode of operation or the highway mode of operation. In some embodiments, the collection mode of operation and the highway mode of operation include different braking settings for the tractive elements of the refuse vehicle.

In some embodiments, the refuse vehicle is a fully electric refuse vehicle configured to use electrical energy provided by the battery to transport the refuse vehicle and to perform one or more refuse collection operations. In some embodiments, when the refuse vehicle is in the collection mode of operation, responsive to depression of a brake pedal, the processing circuitry is configured to operate the electrified axle to perform regenerative braking for the plurality of tractive elements and generate electrical energy for charging of and storage in the battery of the refuse vehicle.

In some embodiments, the processing circuitry is configured to transition the refuse vehicle into the collection mode of operation in response to the speed of transport of the refuse vehicle being less than a threshold speed, and transition the refuse vehicle into the highway mode of operation in response to the speed of transport of the refuse vehicle being greater than the threshold speed. In some embodiments, in the collection mode of operation, the processing circuitry is configured to operate the electrified axle of the refuse vehicle to transport at a baseline speed even when an accelerator pedal of the refuse vehicle is not depressed. In some embodiments, the processing circuitry is configured to operate the electrified axle to drive the plurality of tractive elements to transport the refuse vehicle responsive to depression of the accelerator pedal to achieve a speed greater than the baseline speed.

In some embodiments, in the highway mode of operation, the processing circuitry is configured to use a first relationship between a degree of depression of a brake pedal and an amount of braking provided to the tractive elements of the refuse vehicle such that depression of the brake pedal a first amount results in a first amount of braking being provided to the plurality of tractive elements. In some embodiments, in the collection mode of operation, the processing circuitry is configured to use a second relationship between the degree of depression of the brake pedal and the amount of braking provided to the tractive elements of the refuse vehicle such that depression of the brake pedal the first amount results in a second amount of braking being provided to the plurality of tractive elements. In some embodiments, the first amount of braking and the second amount of braking are different for the depression of the brake pedal the first amount.

In some embodiments, the first amount of braking is less than the second amount of braking. In some embodiments, the first relationship includes a first linear relationship and the second relationship includes a second linear relationship. In some embodiments, a slope of the first linear relationship is less than a slope of the second linear relationship.

Another implementation of the present disclosure is a control system for a refuse vehicle, according to some embodiments. In some embodiments, the control system includes processing circuitry configured to obtain a speed of transport of the refuse vehicle or an indication of activation of a lift apparatus of the refuse vehicle. In some embodiments, the processing circuitry is configured to transition the refuse vehicle between a collection mode of operation and a highway mode of operation based on at least one of the speed of transport of the refuse vehicle or the indication of activation of the lift apparatus of the refuse vehicle. In some embodiments, the processing circuitry is configured to operate the refuse vehicle according to the collection mode of operation or the highway mode of operation, wherein the collection mode of operation and the highway mode of operation comprise different braking settings for a plurality of tractive elements of the refuse vehicle.

In some embodiments, the refuse vehicle is a fully electric refuse vehicle configured to use electrical energy provided by a battery to transport the refuse vehicle and to perform one or more refuse collection operations. In some embodiments, when the refuse vehicle is in the collection mode of operation, responsive to depression of a brake pedal, the processing circuitry is configured to operate an electrified axle of the refuse vehicle to perform regenerative braking for the tractive elements and generate electrical energy for charging of and storage in a battery of the refuse vehicle. In some embodiments, the processing circuitry is configured to transition the refuse vehicle into the collection mode of operation in response to the speed of transport of the refuse vehicle being less than a threshold speed, and transition the refuse vehicle into the highway mode of operation in response to the speed of transport of the refuse vehicle being greater than the threshold speed.

In some embodiments, in the collection mode of operation, the processing circuitry is configured to operate an electrified axle of the refuse vehicle to transport at a baseline speed even when an accelerator pedal of the refuse vehicle is not depressed. In some embodiments, the processing circuitry is configured to operate the electrified axle to drive the tractive elements to transport the refuse vehicle responsive to depression of the accelerator pedal to achieve a speed greater than the baseline speed.

In some embodiments, in the highway mode of operation, the processing circuitry is configured to use a first relationship between a degree of depression of a brake pedal and an amount of braking provided to the tractive elements of the refuse vehicle such that depression of the brake pedal a first amount results in a first amount of braking being provided to the plurality of tractive elements. In some embodiments, in the collection mode of operation, the processing circuitry is configured to use a second relationship between the degree of depression of the brake pedal and the amount of braking provided to the tractive elements of the refuse vehicle such that depression of the brake pedal the first amount results in a second amount of braking being provided to the tractive elements. In some embodiments, the first amount of braking and the second amount of braking are different for the depression of the brake pedal the first amount.

In some embodiments, the first amount of braking is less than the second amount of braking. In some embodiments, the first relationship includes a first linear relationship and the second relationship includes a second linear relationship. In some embodiments, a slope of the first linear relationship is less than a slope of the second linear relationship.

Another implementation of the present disclosure is a method for controlling a refuse vehicle, according to some embodiments. In some embodiments, the method includes obtaining a speed of transport of the refuse vehicle or an indication of activation of a lift apparatus of the refuse vehicle. In some embodiments, the method includes transitioning the refuse vehicle between a collection mode of operation and a highway mode of operation based on at least one of the speed of transport of the refuse vehicle or the indication of activation of the lift apparatus of the refuse vehicle. In some embodiments, the method includes operating the refuse vehicle according to the collection mode of operation or the highway mode of operation. In some embodiments, the collection mode of operation and the highway mode of operation include different braking settings for tractive elements of the refuse vehicle.

In some embodiments, the method further includes, in the collection mode of operation, operating an electrified axle of the refuse vehicle to transport the refuse vehicle at a baseline speed even when an accelerator pedal of the refuse vehicle is not depressed, and operating the electrified axle to drive the plurality of tractive elements to transport the refuse vehicle responsive to depression of the accelerator pedal to achieve a speed greater than the baseline speed.

In some embodiments, the method includes, in the highway mode of operation, using a first relationship between a degree of depression of a brake pedal and an amount of braking provided to the tractive elements of the refuse vehicle such that depression of the brake pedal a first amount results in a first amount of braking being provided to the tractive elements. In some embodiments, the method includes, in the collection mode of operation, using a second relationship between the degree of depression of the brake pedal and the amount of braking provided to the tractive elements of the refuse vehicle such that depression of the brake pedal the first amount results in a second amount of braking being provided to the plurality of tractive elements. In some embodiments, the first amount of braking and the second amount of braking are different for the depression of the brake pedal the first amount.

In some embodiments, the first relationship includes a first linear relationship and the second relationship includes a second linear relationship. In some embodiments, a slope of the first linear relationship is less than a slope of the second linear relationship.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, an electric refuse vehicle is operable in a collection mode of operation and a driving or highway mode of operation. When in the collection mode of operation, the refuse vehicle may be configured to creep (e.g., operate to transport forwards) even when an accelerator pedal is not pressed. The collection mode of operation and the highway mode of operation can have different braking settings. The electric refuse vehicle can be transitionable between the highway mode and the collection mode manually, automatically based on a speed of the vehicle, or automatically based on an activation of a lifting apparatus of the refuse vehicle.

Overall Vehicle

Figure 1:
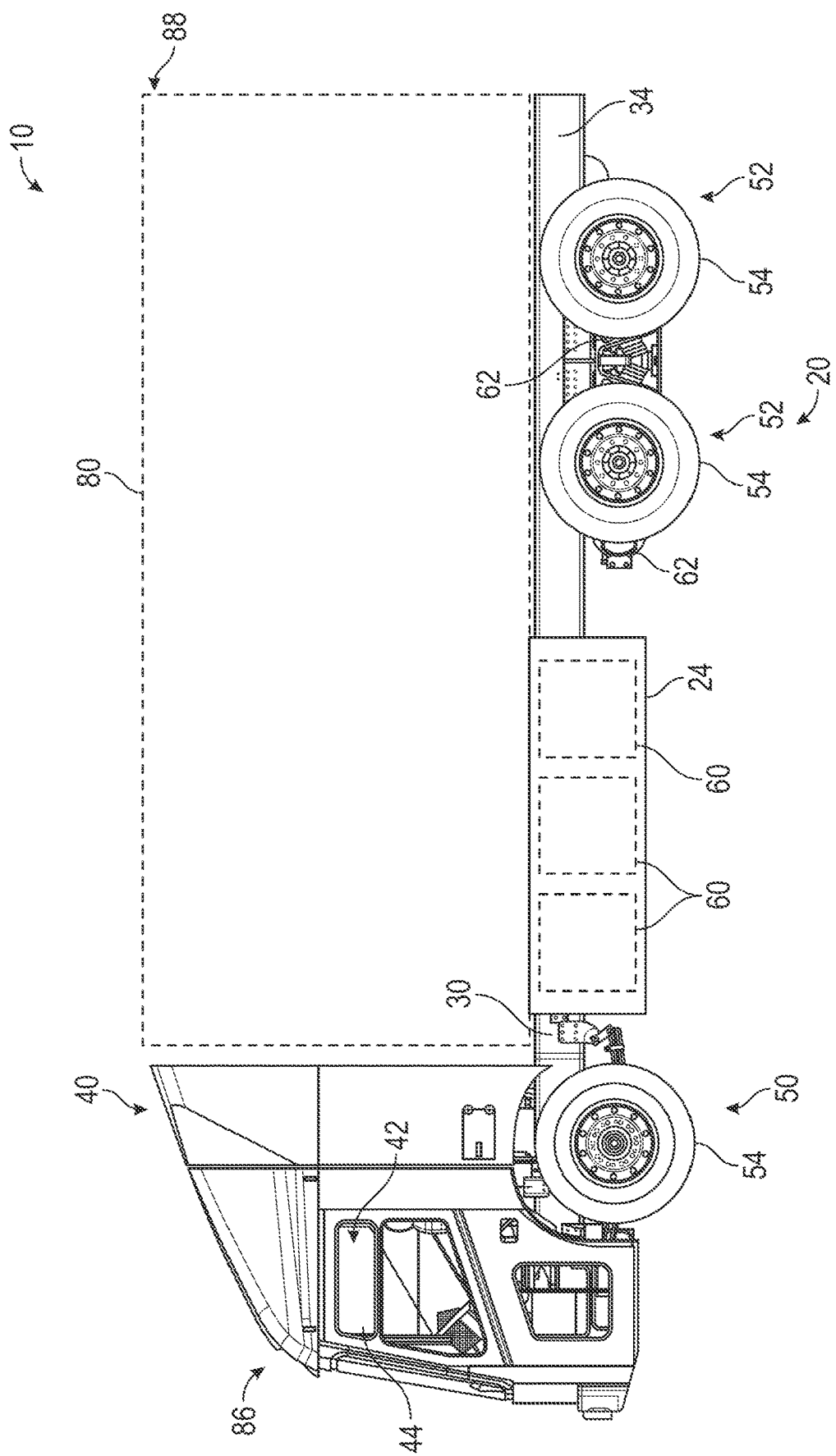
FIG. 1 is a left side view of a vehicle, according to an exemplary embodiment.
Figure 2:
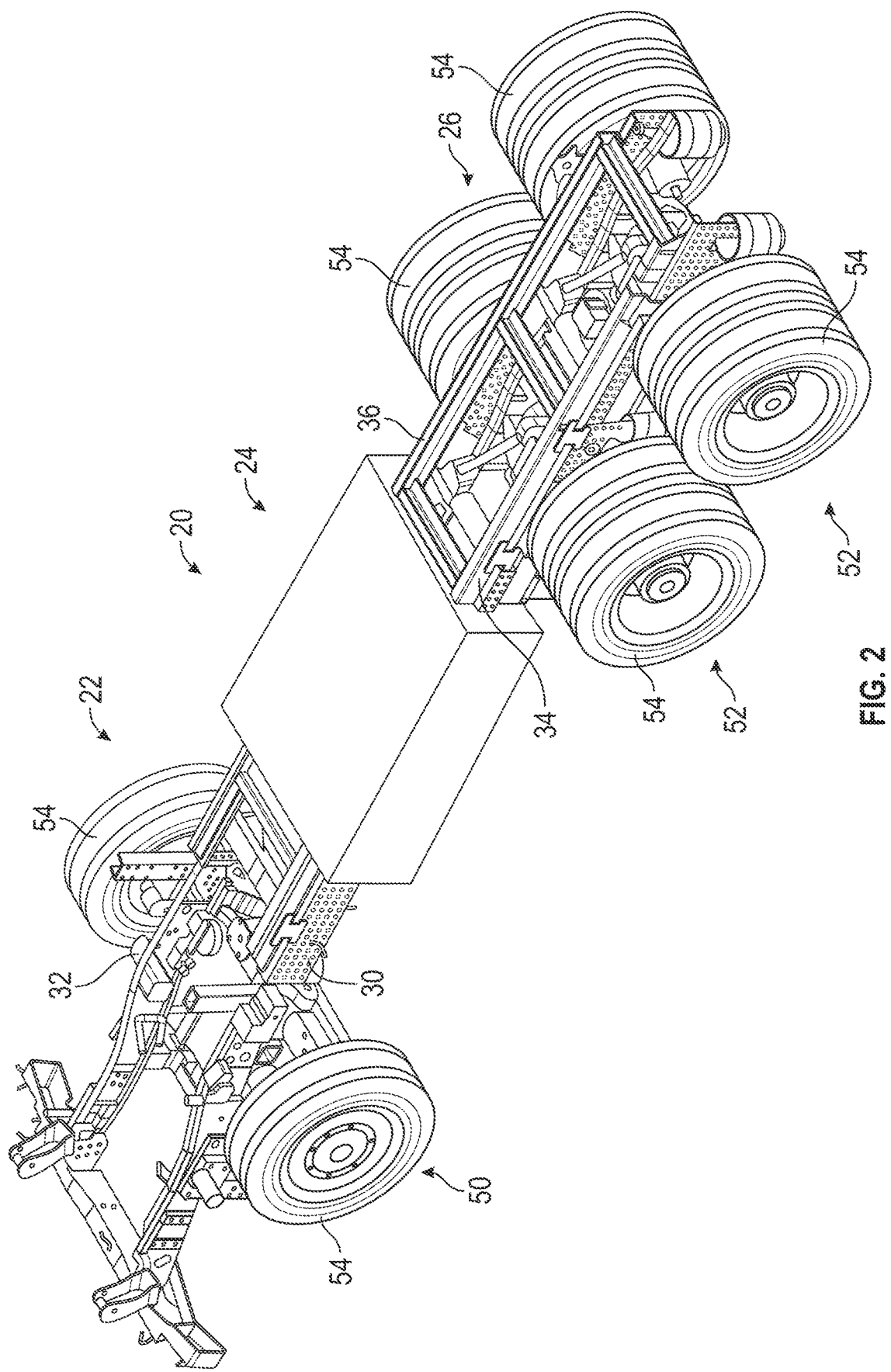
FIG. 2 is a perspective view of a chassis of the vehicle of FIG. 1.

Referring to FIGS. 1 and 2, a reconfigurable vehicle (e.g., a vehicle assembly, a truck, a vehicle base, etc.) is shown as vehicle 10, according to an exemplary embodiment. As shown, the vehicle 10 includes a frame assembly or chassis assembly, shown as chassis 20, that supports other components of the vehicle 10. The chassis 20 extends longitudinally along a length of the vehicle 10, substantially parallel to a primary direction of travel of the vehicle 10. As shown, the chassis 20 includes three sections or portions, shown as front section 22, middle section 24, and rear section 26. The middle section 24 of the chassis 20 extends between the front section 22 and the rear section 26. In some embodiments, the middle section 24 of the chassis 20 couples the front section 22 to the rear section 26. In other embodiments, the front section 22 is coupled to the rear section 26 by another component (e.g., the body of the vehicle 10).

As shown in FIG. 2, the front section 22 includes a pair of frame portions, frame members, or frame rails, shown as front rail portion 30 and front rail portion 32. The rear section 26 includes a pair of frame portions, frame members, or frame rails, shown as rear rail portion 34 and rear rail portion 36. The front rail portion 30 is laterally offset from the front rail portion 32. Similarly, the rear rail portion 34 is laterally offset from the rear rail portion 36. This spacing may provide frame stiffness and space for vehicle components (e.g., batteries, motors, axles, gears, etc.) between the frame rails. In some embodiments, the front rail portions 30 and 32 and the rear rail portions 34 and 36 extend longitudinally and substantially parallel to one another. The chassis 20 may include additional structural elements (e.g., cross members that extend between and couple the frame rails).

In some embodiments, the front section 22 and the rear section 26 are configured as separate, discrete subframes (e.g., a front subframe and a rear subframe). In such embodiments, the front rail portion 30, the front rail portion 32, the rear rail portion 34, and the rear rail portion 36 are separate, discrete frame rails that are spaced apart from one another. In some embodiments, the front section 22 and the rear section 26 are each directly coupled to the middle section 24 such that the middle section 24 couples the front section 22 to the rear section 26. Accordingly, the middle section 24 may include a structural housing or frame. In other embodiments, the front section 22, the middle section 24, and the rear section 26 are coupled to one another by another component, such as a body of the vehicle 10.

In other embodiments, the front section 22, the middle section 24, and the rear section 26 are defined by a pair of frame rails that extend continuously along the entire length of the vehicle 10. In such an embodiment, the front rail portion 30 and the rear rail portion 34 would be front and rear portions of a first frame rail, and the front rail portion 32 and the rear rail portion 36 would be front and rear portions of a second frame rail. In such embodiments, the middle section 24 would include a center portion of each frame rail.

In some embodiments, the middle section 24 acts as a storage portion that includes one or more vehicle components. The middle section 24 may include an enclosure that contains one or more vehicle components and/or a frame that supports one or more vehicle components. By way of example, the middle section 24 may contain or include one or more electrical energy storage devices (e.g., batteries, capacitors, etc.). By way of another example, the middle section 24 may include fuel tanks. By way of yet another example, the middle section 24 may define a void space or storage volume that can be filled by a user.

A cabin, operator compartment, or body component, shown as cab 40, is coupled to a front end portion of the chassis 20 (e.g., the front section 22 of the chassis 20). Together, the chassis 20 and the cab 40 define a front end of the vehicle 10. The cab 40 extends above the chassis 20. The cab 40 includes an enclosure or main body that defines an interior volume, shown as cab interior 42, that is sized to contain one or more operators. The cab 40 also includes one or more doors 44 that facilitate selective access to the cab interior 42 from outside of the vehicle 10. The cab interior 42 contains one or more components that facilitate operation of the vehicle 10 by the operator. By way of example, the cab interior 42 may contain components that facilitate operator comfort (e.g., seats, seatbelts, etc.), user interface components that receive inputs from the operators (e.g., steering wheels, pedals, touch screens, switches, buttons, levers, etc.), and/or user interface components that provide information to the operators (e.g., lights, gauges, speakers, etc.). The user interface components within the cab 40 may facilitate operator control over the drive components of the vehicle 10 and/or over any implements of the vehicle 10.

The vehicle 10 further includes a series of axle assemblies, shown as front axle 50 and rear axles 52. As shown, the vehicle 10 includes one front axle 50 coupled to the front section 22 of the chassis 20 and two rear axles 52 each coupled to the rear section 26 of the chassis 20. In other embodiments, the vehicle 10 includes more or fewer axles. By way of example, the vehicle 10 may include a tag axle that may be raised or lowered to accommodate variations in weight being carried by the vehicle 10. The front axle 50 and the rear axles 52 each include a series of tractive elements (e.g., wheels, treads, etc.), shown as wheel and tire assemblies 54. The wheel and tire assemblies 54 are configured to engage a support surface (e.g., roads, the ground, etc.) to support and propel the vehicle 10. The front axle 50 and the rear axles 52 may include steering components (e.g., steering arms, steering actuators, etc.), suspension components (e.g., gas springs, dampeners, air springs, etc.), power transmission or drive components (e.g., differentials, drive shafts, etc.), braking components (e.g., brake actuators, brake pads, brake discs, brake drums, etc.), and/or other components that facilitate propulsion or support of the vehicle.

In some embodiments, the vehicle 10 is configured as an electric vehicle that is propelled by an electric powertrain system. Referring to FIG. 1, the vehicle 10 includes one or more electrical energy storage devices (e.g., batteries, capacitors, etc.), shown as batteries 60. As shown, the batteries 60 are positioned within the middle section 24 of the chassis 20. In other embodiments, the batteries 60 are otherwise positioned throughout the vehicle 10. The vehicle further includes one or more electromagnetic devices or prime movers (e.g., motor/generators), shown as drive motors 62. The drive motors 62 are electrically coupled to the batteries 60. The drive motors 62 may be configured to receive electrical energy from the batteries 60 and provide rotational mechanical energy to the wheel and tire assemblies 54 to propel the vehicle 10. The drive motors 62 may be configured to receive rotational mechanical energy from the wheel and tire assemblies 64 and provide electrical energy to the batteries 60, providing a braking force to slow the vehicle 10.

The batteries 60 may include one or more rechargeable batteries (e.g., lithium-ion batteries, nickel-metal hydride batteries, lithium-ion polymer batteries, lead-acid batteries, nickel-cadmium batteries, etc.). The batteries 60 may be charged by one or more sources of electrical energy onboard the vehicle 10 (e.g., solar panels, etc.) or separate from the vehicle 10 (e.g., connections to an electrical power grid, a wireless charging system, etc.). As shown, the drive motors 62 are positioned within the rear axles 52 (e.g., as part of a combined axle and motor assembly). In other embodiments, the drive motors 62 are otherwise positioned within the vehicle 10.

In other embodiments, the vehicle 10 is configured as a hybrid vehicle that is propelled by a hybrid powertrain system (e.g., a diesel/electric hybrid, gasoline/electric hybrid, natural gas/electric hybrid, etc.). According to an exemplary embodiment, the hybrid powertrain system may include a primary driver (e.g., an engine, a motor, etc.), an energy generation device (e.g., a generator, etc.), and/or an energy storage device (e.g., a battery, capacitors, ultracapacitors, etc.) electrically coupled to the energy generation device. The primary driver may combust fuel (e.g., gasoline, diesel, etc.) to provide mechanical energy, which a transmission may receive and provide to the front axle 50 and/or the rear axles 52 to propel the vehicle 10. Additionally or alternatively, the primary driver may provide mechanical energy to the generator, which converts the mechanical energy into electrical energy. The electrical energy may be stored in the energy storage device (e.g., the batteries 60) in order to later be provided to a motive driver.

In yet other embodiments, the chassis 20 may further be configured to support non-hybrid powertrains. For example, the powertrain system may include a primary driver that is a compression-ignition internal combustion engine that utilizes diesel fuel.

Referring to FIG. 1, the vehicle 10 includes a rear assembly, module, implement, body, or cargo area, shown as application kit 80. The application kit 80 may include one or more implements, vehicle bodies, and/or other components. Although the application kit 80 is shown positioned behind the cab 40, in other embodiments the application kit 80 extends forward of the cab 40. The vehicle 10 may be outfitted with a variety of different application kits 80 to configure the vehicle 10 for use in different applications. Accordingly, a common vehicle 10 can be configured for a variety of different uses simply by selecting an appropriate application kit 80. By way of example, the vehicle 10 may be configured as a refuse vehicle, a concrete mixer, a fire fighting vehicle, an airport fire fighting vehicle, a lift device (e.g., a boom lift, a scissor lift, a telehandler, a vertical lift, etc.), a crane, a tow truck, a military vehicle, a delivery vehicle, a mail vehicle, a boom truck, a plow truck, a farming machine or vehicle, a construction machine or vehicle, a coach bus, a school bus, a semi-truck, a passenger or work vehicle (e.g., a sedan, a SUV, a truck, a van, etc.), and/or still another vehicle. FIGS. 3-13 illustrate various examples of how the vehicle 10 may be configured for specific applications. Although only a certain set of vehicle configurations is shown, it should be understood that the vehicle 10 may be configured for use in other applications that are not shown.

The application kit 80 may include various actuators to facilitate certain functions of the vehicle 10. By way of example, the application kit 80 may include hydraulic actuators (e.g., hydraulic cylinders, hydraulic motors, etc.), pneumatic actuators (e.g., pneumatic cylinders, pneumatic motors, etc.), and/or electrical actuators (e.g., electric motors, electric linear actuators, etc.). The application kit 80 may include components that facilitate operation of and/or control of these actuators. By way of example, the application kit 80 may include hydraulic or pneumatic components that form a hydraulic or pneumatic circuit (e.g., conduits, valves, pumps, compressors, gauges, reservoirs, accumulators, etc.). By way of another example, the application kit 80 may include electrical components (e.g., batteries, capacitors, voltage regulators, motor controllers, etc.). The actuators may be powered by components of the vehicle 10. By way of example, the actuators may be powered by the batteries 60, the drive motors 62, or the primary driver (e.g., through a power take off).

The vehicle 10 generally extends longitudinally from a front side 86 to a rear side 88. The front side 86 is defined by the cab 40 and/or the chassis. The rear side 88 is defined by the application kit 80 and/or the chassis 20. The primary, forward direction of travel of the vehicle is longitudinal, with the front side 86 being arranged forward of the rear side 88.

A. Front-Loading Refuse Vehicle

Figure 3:
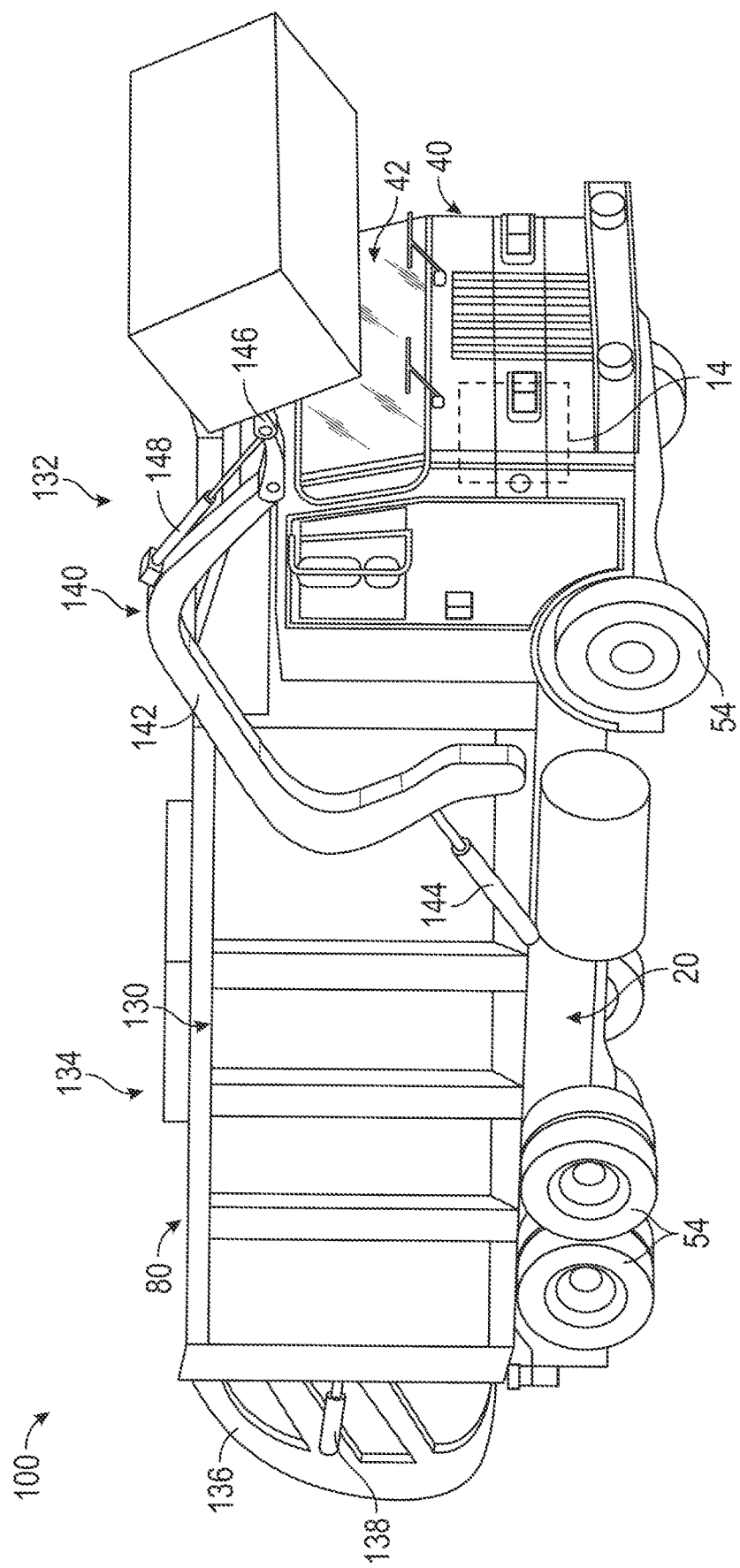
FIG. 3 is a perspective view of the vehicle of FIG. 1 configured as a front-loading refuse vehicle, according to an exemplary embodiment.
Figure 4:
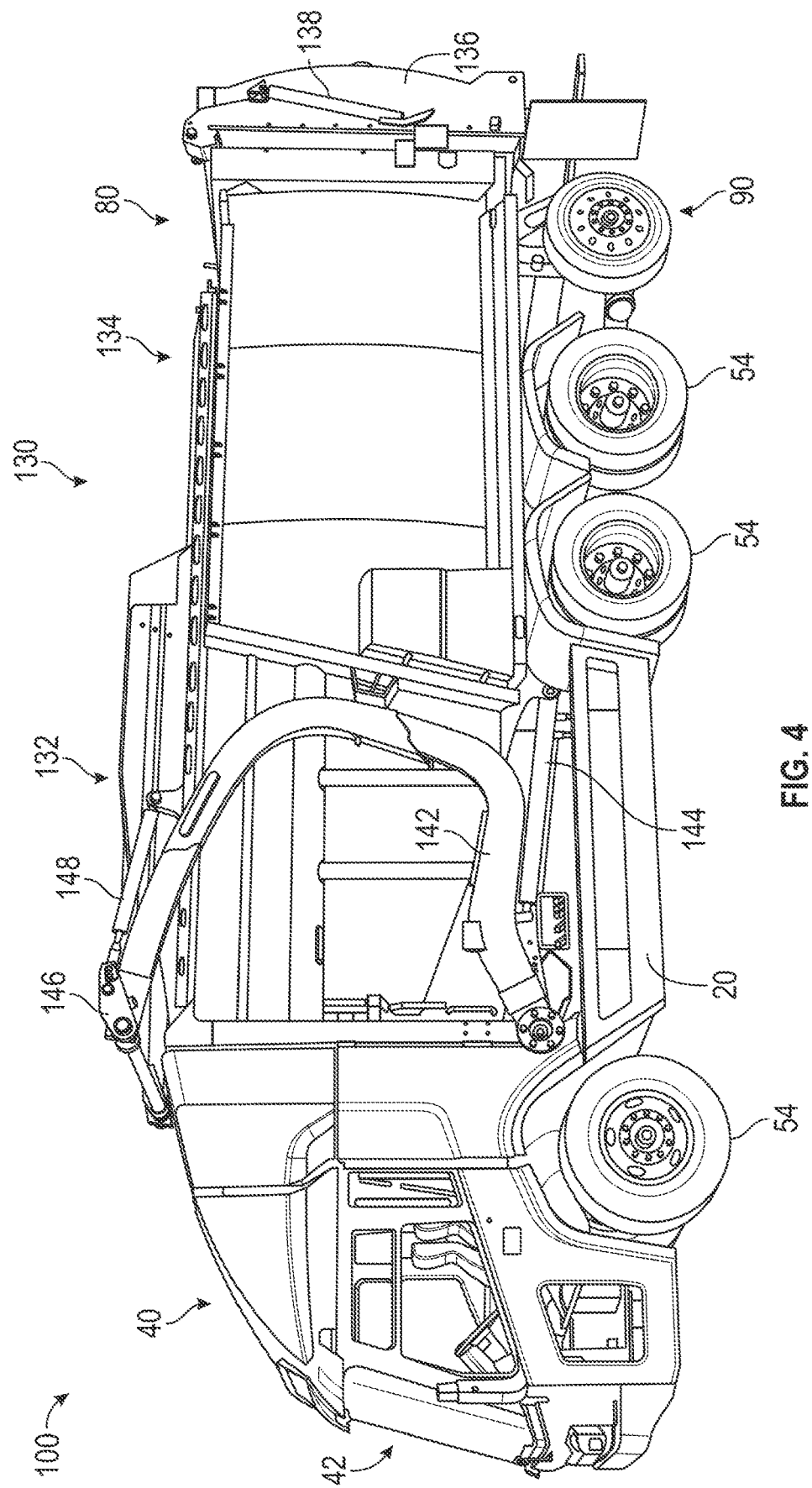
FIG. 4 is a left side view of the front-loading refuse vehicle of FIG. 3 configured with a tag axle.
Figure 5:
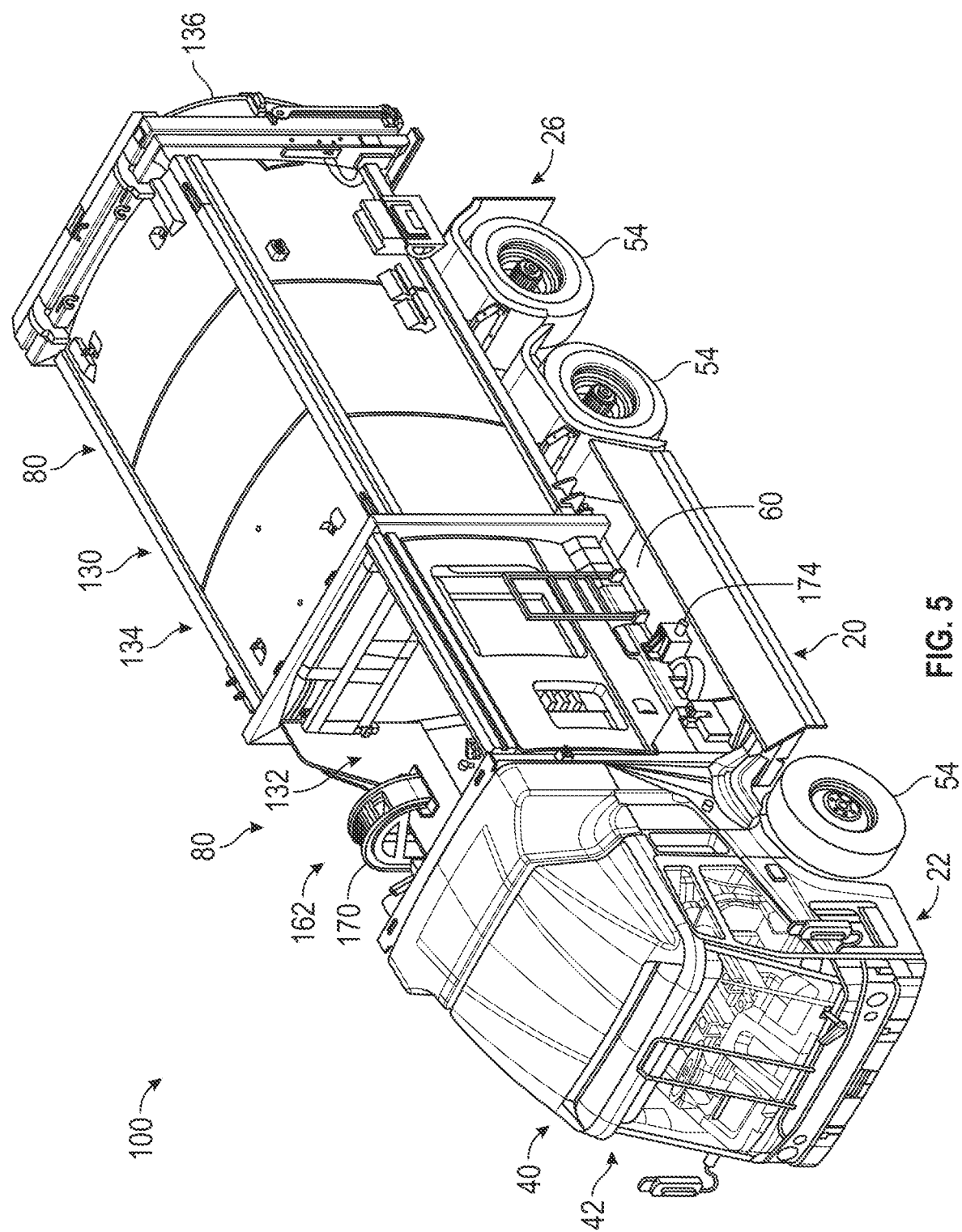
FIG. 5 is a perspective view of the vehicle of FIG. 1 configured as a side-loading refuse vehicle, according to an exemplary embodiment.
Figure 6:
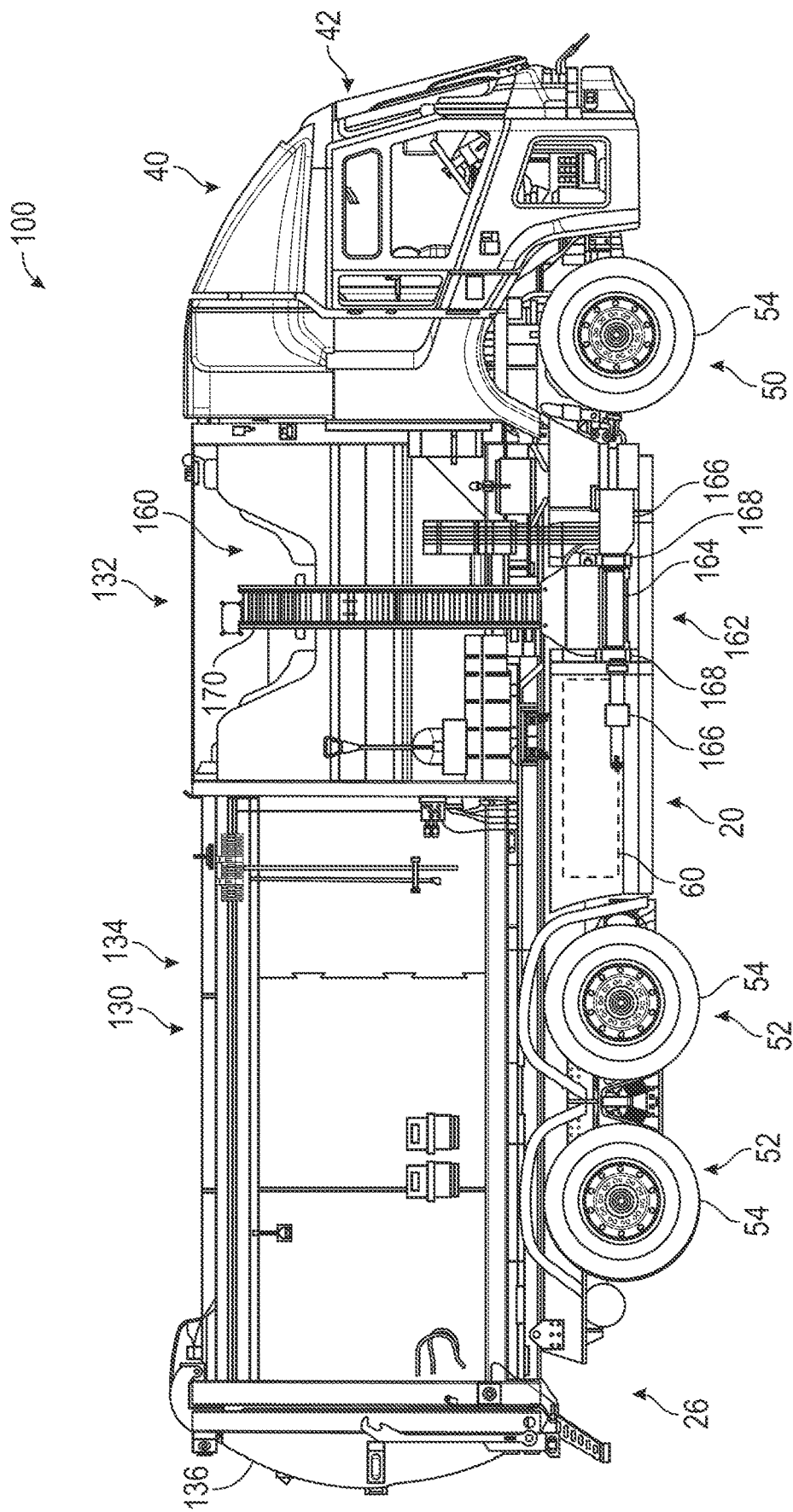
FIG. 6 is a right side view of the side-loading refuse vehicle of FIG. 5.
Figure 7:
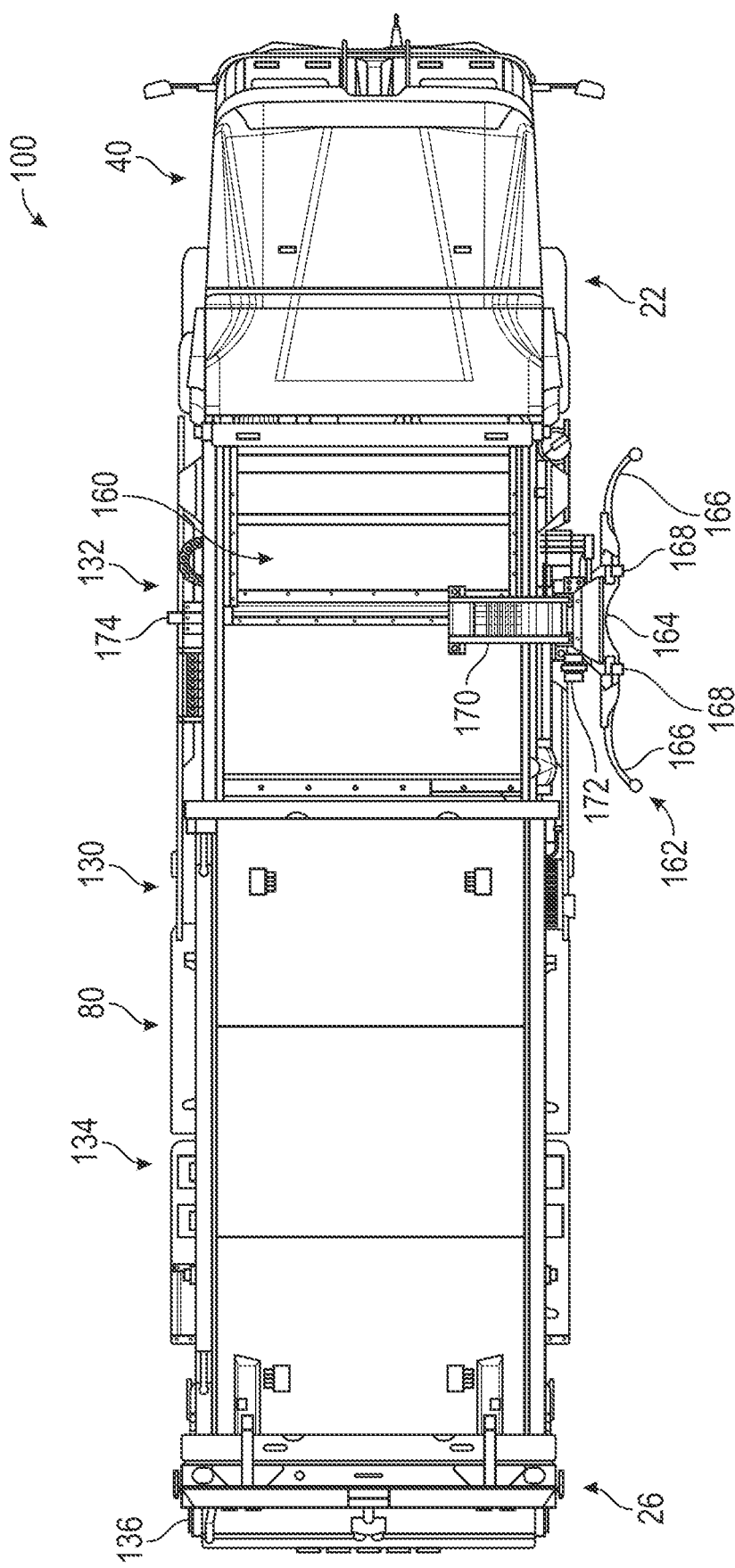
FIG. 7 is a top view of the side-loading refuse vehicle of FIG. 5.

Referring now to FIGS. 3 and 4, the vehicle 10 is configured as a refuse vehicle 100 (e.g., a refuse truck, a garbage truck, a waste collection truck, a sanitation truck, a recycling truck, etc.). Specifically, the refuse vehicle 100 is a front-loading refuse vehicle. In other embodiments, the refuse vehicle 100 is configured as a rear-loading refuse vehicle or a front-loading refuse vehicle. The refuse vehicle 100 may be configured to transport refuse from various waste receptacles (e.g., refuse containers) within a municipality to a storage and/or processing facility (e.g., a landfill, an incineration facility, a recycling facility, etc.).

FIG. 4 illustrates the refuse vehicle 100 of FIG. 3 configured with a liftable axle, shown as tag axle 90, including a pair of wheel and tire assemblies 54. As shown, the tag axle 90 is positioned reward of the rear axles 52. The tag axle 90 can be selectively raised and lowered (e.g., by a hydraulic actuator) to selectively engage the wheel and tire assemblies 54 of the tag axle 90 with the ground. The tag axle 90 may be raised to reduce rolling resistance experienced by the refuse vehicle 100. The tag axle 90 may be lowered to distribute the loaded weight of the vehicle 100 across a greater number of a wheel and tire assemblies 54 (e.g., when the refuse vehicle 100 is loaded with refuse).

As shown in FIGS. 3 and 4, the application kit 80 of the refuse vehicle 100 includes a series of panels that form a rear body or container, shown as refuse compartment 130. The refuse compartment 130 may facilitate transporting refuse from various waste receptacles within a municipality to a storage and/or a processing facility (e.g., a landfill, an incineration facility, a recycling facility, etc.). By way of example, loose refuse may be placed into the refuse compartment 130 where it may be compacted (e.g., by a packer system within the refuse compartment 130). The refuse compartment 130 may also provide temporary storage for refuse during transport to a waste disposal site and/or a recycling facility. In some embodiments, the refuse compartment 130 may define a hopper volume 132 and storage volume 134. In this regard, refuse may be initially loaded into the hopper volume 132 and later compacted into the storage volume 134. As shown, the hopper volume 132 is positioned between the storage volume 134 and the cab 40 (e.g., refuse is loaded into a portion of the refuse compartment 130 behind the cab 40 and stored in a portion further toward the rear of the refuse compartment 130). In other embodiments, the storage volume may be positioned between the hopper volume and the cab 40 (e.g., in a rear-loading refuse truck, etc.). The application kit 80 of the refuse vehicle 100 further includes a pivotable rear portion, shown as tailgate 136, that is pivotally coupled to the refuse compartment 130. The tailgate 136 may be selectively repositionable between a closed position and an open position by an actuator (e.g., a hydraulic cylinder, an electric linear actuator, etc.), shown as tailgate actuator 138 (e.g., to facilitate emptying the storage volume).

As shown in FIGS. 3 and 4, the refuse vehicle 100 also includes an implement, shown as lift assembly 140, which is a front-loading lift assembly. According to an exemplary embodiment, the lift assembly 140 includes a pair of lift arms 142 and a pair of actuators (e.g., hydraulic cylinders, electric linear actuators, etc.), shown as lift arm actuators 144. The lift arms 142 may be rotatably coupled to the chassis 20 and/or the refuse compartment 130 on each side of the refuse vehicle 100 (e.g., through a pivot, a lug, a shaft, etc.), such that the lift assembly 140 may extend forward relative to the cab 40 (e.g., a front-loading refuse truck, etc.). In other embodiments, the lift assembly 140 may extend rearward relative to the application kit 80 (e.g., a rear-loading refuse truck). As shown in FIGS. 3 and 4, in an exemplary embodiment the lift arm actuators 144 may be positioned such that extension and retraction of the lift arm actuators 144 rotates the lift arms 142 about an axis extending through the pivot. In this regard, the lift arms 142 may be rotated by the lift arm actuators 144 to lift a refuse container over the cab 40. The lift assembly 140 further includes a pair of interface members, shown as lift forks 146, each pivotally coupled to a distal end of one of the lift arms 142. The lift forks 146 may be configured to engage a refuse container (e.g., a dumpster) to selectively couple the refuse container to the lift arms 142. By way of example, each of the lift forks 146 may be received within a corresponding pocket defined by the refuse container. A pair of actuators (e.g., hydraulic cylinders, electric linear actuators, etc.), shown as articulation actuators 148, are each coupled to one of the lift arms 142 and one of the lift forks 146. The articulation actuators 148 may be positioned to rotate the lift forks 146 relative to the lift arms 142 about a horizontal axis. Accordingly, the articulation actuators 148 may assist in tipping refuse out of the refuse container and into the refuse compartment 130. The lift arm actuators 144 may then rotate the lift arms 142 to return the empty refuse container to the ground.

B. Side-Loading Refuse Vehicle

Figure 8:
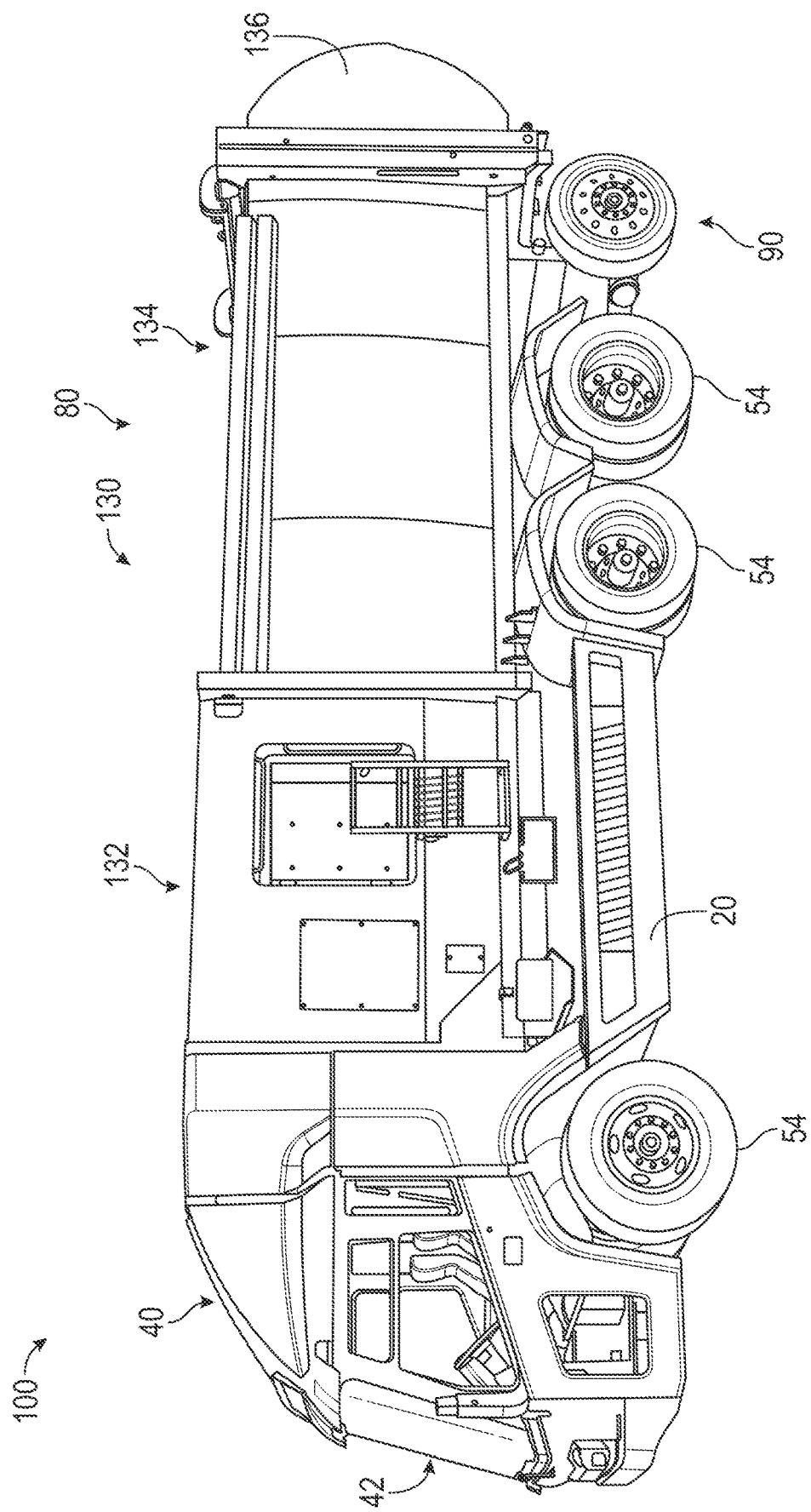
FIG. 8 is a left side view of the side-loading refuse vehicle of FIG. 5 configured with a tag axle.

Referring now to FIGS. 5-8, an alternative configuration of the refuse vehicle 100 is shown according to an exemplary embodiment. Specifically, the refuse vehicle 100 of FIGS. 5-8 is configured as a side-loading refuse vehicle. The refuse vehicle 100 of FIGS. 5-8 may be substantially similar to the front-loading refuse vehicle 100 of FIGS. 3 and 4 except as otherwise specified herein. As shown in FIG. 8, the refuse vehicle 100 of FIGS. 5-7 may be configured with a tag axle 90.

Referring still to FIGS. 5-8, the refuse vehicle 100 omits the lift assembly 140 and instead includes a side-loading lift assembly, shown as lift assembly 160, that extends laterally outward from a side of the refuse vehicle 100. The lift assembly 160 includes an interface assembly, shown as grabber assembly 162, that is configured to engage a refuse container (e.g., a residential garbage can) to selectively couple the refuse container to the lift assembly 160. The grabber assembly 162 includes a main portion, shown as main body 164, and a pair of fingers or interface members, shown as grabber fingers 166. The grabber fingers 166 are pivotally coupled to the main body 164 such that the grabber fingers 166 are each rotatable about a vertical axis. A pair of actuators (e.g., hydraulic motors, electric motors, etc.), shown as finger actuators 168, are configured to control movement of the grabber fingers 166 relative to the main body 164.

The grabber assembly 162 is movably coupled to a guide, shown as track 170, that extends vertically along a side of the refuse vehicle 100. Specifically, the main body 164 is slidably coupled to the track 170 such that the main body 164 is repositionable along a length of the track 170. An actuator (e.g., a hydraulic motor, an electric motor, etc.), shown as lift actuator 172, is configured to control movement of the grabber assembly 162 along the length of the track 170. In some embodiments, a bottom end portion of the track 170 is straight and substantially vertical such that the grabber assembly 162 raises or lowers a refuse container when moving along the bottom end portion of the track 170. In some embodiments, a top end portion of the track 170 is curved such that the grabber assembly 162 inverts a refuse container to dump refuse into the hopper volume 132 when moving along the top end portion of the track 170.

The lift assembly 160 further includes an actuator (e.g., a hydraulic cylinder, an electric linear actuator, etc.), shown as track actuator 174, that is configured to control lateral movement of the grabber assembly 162. By way of example, the track actuator 174 may be coupled to the chassis 20 and the track 170 such that the track actuator 174 moves the track 170 and the grabber assembly 162 laterally relative to the chassis 20. The track actuator 174 may facilitate repositioning the grabber assembly 162 to pick up and replace refuse containers that are spaced laterally outward from the refuse vehicle 100.

C. Concrete Mixer Truck

Figure 9:
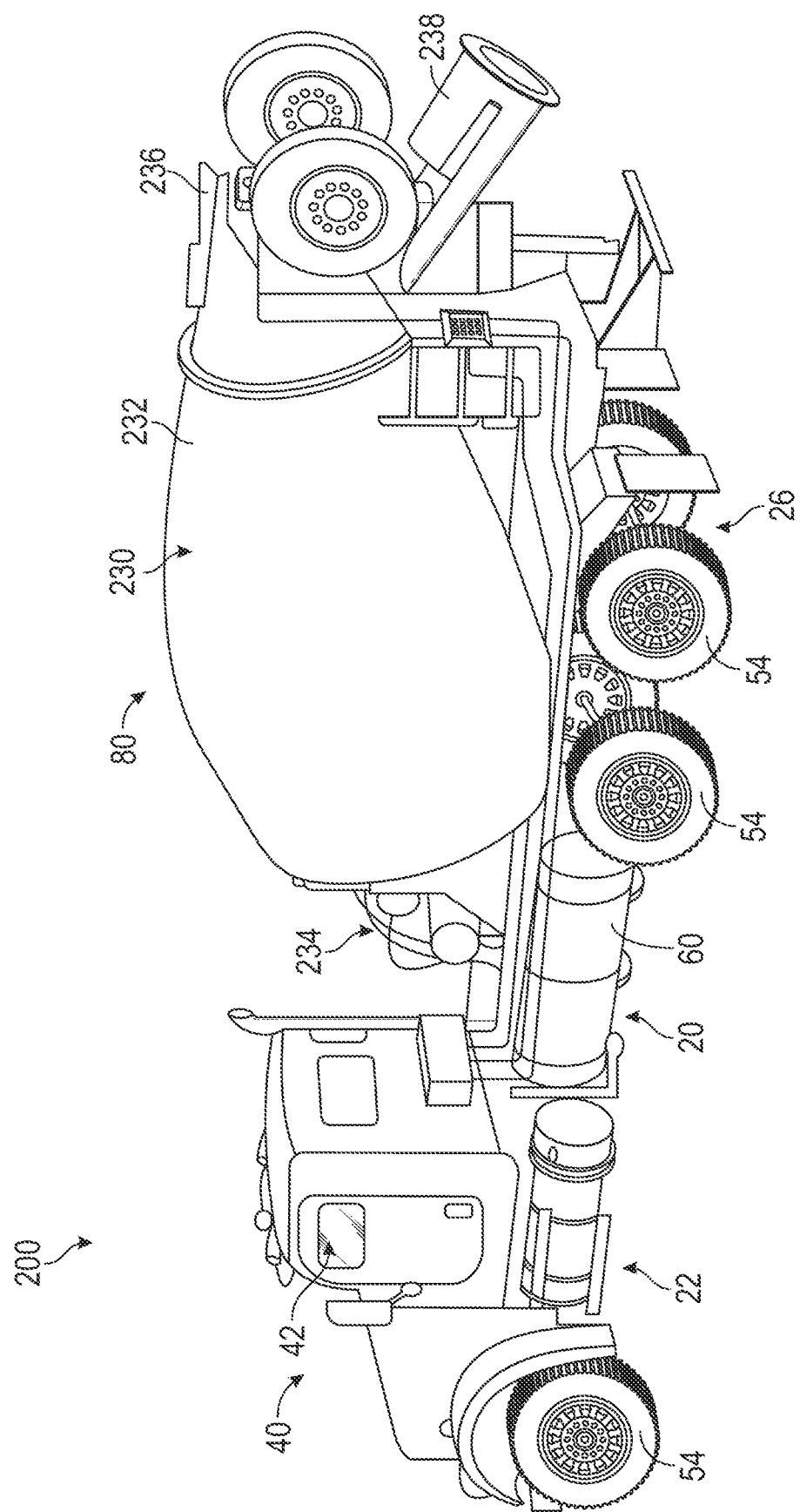
FIG. 9 is a perspective view of the vehicle of FIG. 1 configured as a mixer vehicle, according to an exemplary embodiment.

Referring now to FIG. 9, the vehicle 10 is configured as a mixer truck (e.g., a concrete mixer truck, a mixer vehicle, etc.), shown as mixer truck 200. Specifically, the mixer truck 200 is shown as a rear-discharge concrete mixer truck. In other embodiments, the mixer truck 200 is a front-discharge concrete mixer truck.

As shown in FIG. 9, the application kit 80 includes a mixing drum assembly (e.g., a concrete mixing drum), shown as drum assembly 230. The drum assembly 230 may include a mixing drum 232, a drum drive system 234 (e.g., a rotational actuator or motor, such as an electric motor or hydraulic motor), an inlet portion, shown as hopper 236, and an outlet portion, shown as chute 238. The mixing drum 232 may be coupled to the chassis 20 and may be disposed behind the cab 40 (e.g., at the rear and/or middle of the chassis 20). In an exemplary embodiment, the drum drive system 234 is coupled to the chassis 20 and configured to selectively rotate the mixing drum 232 about a central, longitudinal axis. According to an exemplary embodiment, the central, longitudinal axis of the mixing drum 232 may be elevated from the chassis 20 (e.g., from a horizontal plane extending along the chassis 20) at an angle in the range of five degrees to twenty degrees. In other embodiments, the central, longitudinal axis may be elevated by less than five degrees (e.g., four degrees, etc.). In yet another embodiment, the mixer truck 200 may include an actuator positioned to facilitate adjusting the central, longitudinal axis to a desired or target angle (e.g., manually in response to an operator input/command, automatically according to a control system, etc.).

The mixing drum 232 may be configured to receive a mixture, such as a concrete mixture (e.g., cementitious material, aggregate, sand, etc.), through the hopper 236. In some embodiments, the mixer truck 200 includes an injection system (e.g., a series of nozzles, hoses, and/or valves) including an injection valve that selectively fluidly couples a supply of fluid to the inner volume of the mixing drum 232. By way of example, the injection system may be used to inject water and/or chemicals (e.g., air entrainers, water reducers, set retarders, set accelerators, superplasticizers, corrosion inhibitors, coloring, calcium chloride, minerals, and/or other concrete additives, etc.) into the mixing drum 232. The injection valve may facilitate injecting water and/or chemicals from a fluid reservoir (e.g., a water tank, etc.) into the mixing drum 232, while preventing the mixture in the mixing drum 232 from exiting the mixing drum 232 through the injection system. In some embodiments, one or more mixing elements (e.g., fins, etc.) may be positioned in the interior of the mixing drum 232, and may be configured to agitate the contents of the mixture when the mixing drum 232 is rotated in a first direction (e.g., counterclockwise, clockwise, etc.), and drive the mixture out through the chute 238 when the mixing drum 232 is rotated in a second direction (e.g., clockwise, counterclockwise, etc.). In some embodiments, the chute 238 may also include an actuator positioned such that the chute 238 may be selectively pivotable to position the chute 238 (e.g., vertically, laterally, etc.), for example at an angle at which the mixture is expelled from the mixing drum 232.

D. Fire Truck

Figure 10:
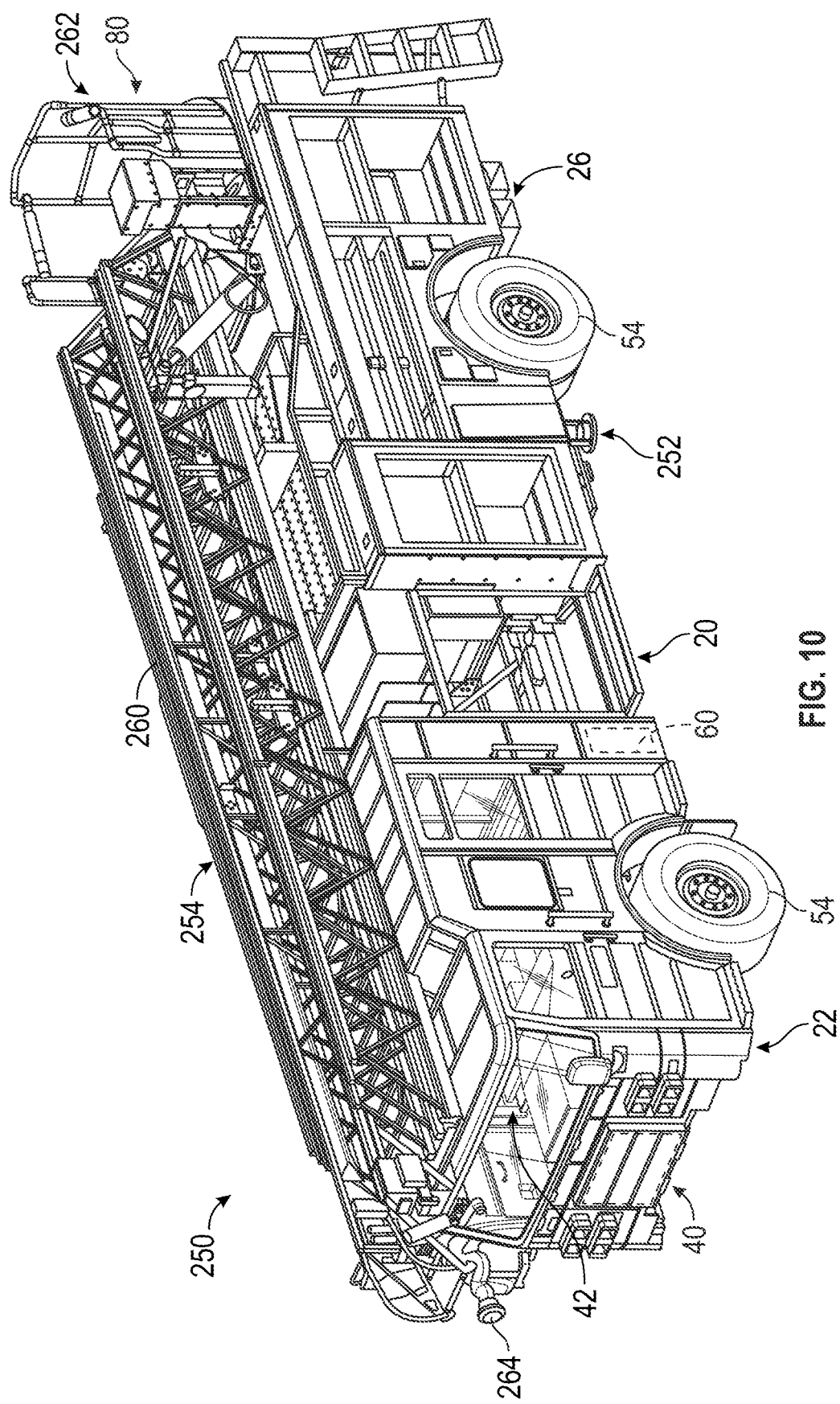
FIG. 10 is a perspective view of the vehicle of FIG. 1 configured as a fire fighting vehicle, according to an exemplary embodiment.

Referring now to FIG. 10, the vehicle 10 is configured as a fire fighting vehicle, fire truck, or fire apparatus (e.g., a turntable ladder truck, a pumper truck, a quint, etc.), shown as fire fighting vehicle 250. In the embodiment shown in FIG. 10, the fire fighting vehicle 250 is configured as a rear-mount aerial ladder truck. In other embodiments, the fire fighting vehicle 250 is configured as a mid-mount aerial ladder truck, a quint fire truck (e.g., including an onboard water storage, a hose storage, a water pump, etc.), a tiller fire truck, a pumper truck (e.g., without an aerial ladder), or another type of response vehicle. By way of example, the vehicle 10 may be configured as a police vehicle, an ambulance, a tow truck, or still other vehicles used for responding to a scene (e.g., an accident, a fire, an incident, etc.).

As shown in FIG. 10, in the fire fighting vehicle 250, the application kit 80 is positioned mainly rearward from the cab 40. The application kit 80 includes deployable stabilizers (e.g., outriggers, downriggers, etc.), shown as outriggers 252, that are coupled to the chassis 20. The outriggers 252 may be configured to selectively extend from each lateral side and/or the rear of the fire fighting vehicle 250 and engage a support surface (e.g., the ground) in order to provide increased stability while the fire fighting vehicle 250 is stationary. The fire fighting vehicle 250 further includes an extendable or telescoping ladder assembly, shown as ladder assembly 254. The increased stability provided by the outriggers 252 is desirable when the ladder assembly 254 is in use (e.g., extended from the fire fighting vehicle 250) to prevent tipping. In some embodiments, the application kit 80 further includes various storage compartments (e.g., cabinets, lockers, etc.) that may be selectively opened and/or accessed for storage and/or component inspection, maintenance, and/or replacement.

As shown in FIG. 10, the ladder assembly 254 includes a series of ladder sections 260 that are slidably coupled with one another such that the ladder sections 260 may extend and/or retract (e.g., telescope) relative to one another to selectively vary a length of the ladder assembly 254. A base platform, shown as turntable 262, is rotatably coupled to the chassis 20 and to a proximal end of a base ladder section 260 (i.e., the most proximal of the ladder sections 260). The turntable 262 may be configured to rotate about a vertical axis relative to the chassis 20 to rotate the ladder sections 260 about the vertical axis (e.g., up to 360 degrees, etc.). The ladder sections 260 may rotate relative to the turntable 262 about a substantially horizontal axis to selectively raise and lower the ladder sections 260 relative to the chassis 20. As shown, a water turret or implement, shown as monitor 264, is coupled to a distal end of a fly ladder section 260 (i.e., the most distal of the ladder sections 260). The monitor 264 may be configured to expel water and/or a fire suppressing agent (e.g., foam, etc.) from a water storage tank and/or an agent tank onboard the fire fighting vehicle 250, and/or from an external source (e.g., a fire hydrant, a separate water/pumper truck, etc.). In some embodiments, the ladder assembly 254 further includes an aerial platform coupled to the distal end of the fly ladder section 260 and configured to support one or more operators.

E. ARFF Truck

Figure 11:
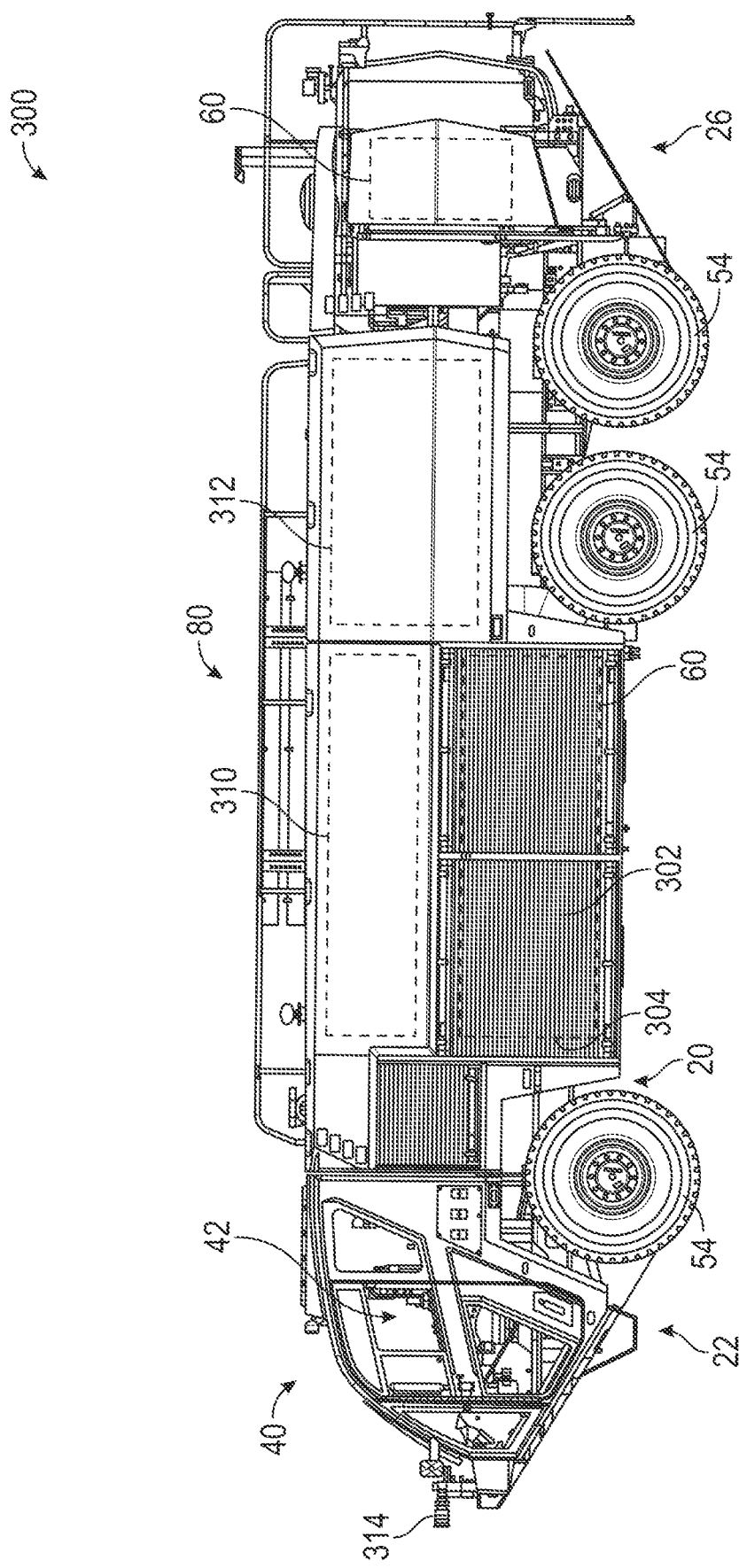
FIG. 11 is a left side view of the vehicle of FIG. 1 configured as an airport fire fighting vehicle, according to an exemplary embodiment.

Referring now to FIG. 11, the vehicle 10 is configured as a fire fighting vehicle, shown as airport rescue and fire fighting (ARFF) truck 300. As shown in FIG. 11, the application kit 80 is positioned primarily rearward of the cab 40. As shown, the application kit 80 includes a series of storage compartments or cabinets, shown as compartments 302, that are coupled to the chassis 20. The compartments 302 may store various equipment or components of the ARFF truck 300.

The application kit 80 includes a pump system 304 (e.g., an ultra-high-pressure pump system, etc.) positioned within one of the compartments 302 near the center of the ARFF truck 300. The application kit 80 further includes a water tank 310, an agent tank 312, and an implement or water turret, shown as monitor 314. The pump system 304 may include a high pressure pump and/or a low pressure pump, which may be fluidly coupled to the water tank 310 and/or the agent tank 312. The pump system 304 may to pump water and/or fire suppressing agent from the water tank 310 and the agent tank 312, respectively, to the monitor 314. The monitor 314 may be selectively reoriented by an operator to adjust a direction of a stream of water and/or agent. As shown in FIG. 11, the monitor 314 is coupled to a front end of the cab 40.

F. Boom Lift

Figure 12:
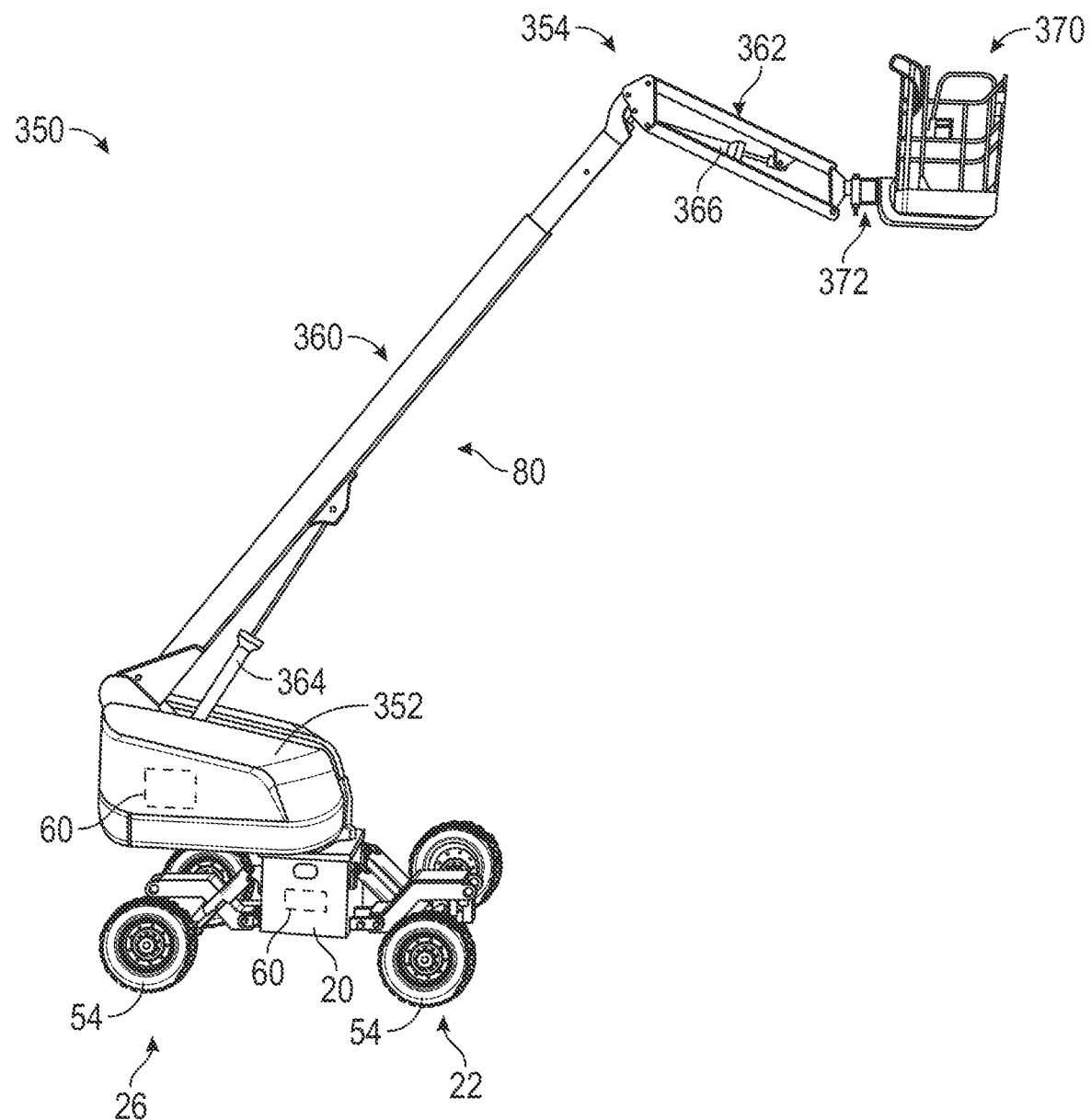
FIG. 12 is a perspective view of the vehicle of FIG. 1 configured as a boom lift, according to an exemplary embodiment.

Referring now to FIG. 12, the vehicle 10 is configured as a lift device, shown as boom lift 350. The boom lift 350 may be configured to support and elevate one or more operators. In other embodiments, the vehicle 10 is configured as another type of lift device that is configured to lift operators and/or material, such as a skid-loader, a telehandler, a scissor lift, a fork lift, a vertical lift, and/or any other type of lift device or machine.

As shown in FIG. 12, the application kit 80 includes a base assembly, shown as turntable 352, that is rotatably coupled to the chassis 20. The turntable 352 may be configured to selectively rotate relative to the chassis 20 about a substantially vertical axis. In some embodiments, the turntable 352 includes a counterweight (e.g., the batteries) positioned near the rear of the turntable 352. The turntable 352 is rotatably coupled to a lift assembly, shown as boom assembly 354. The boom assembly 354 includes a first section or telescoping boom section, shown as lower boom 360. The lower boom 360 includes a series of nested boom sections that extend and retract (e.g., telescope) relative to one another to vary a length of the boom assembly 354. The boom assembly 354 further includes a second boom section or four bar linkage, shown as upper boom 362. The upper boom 362 may includes structural members that rotate relative to one another to raise and lower a distal end of the boom assembly 354. In other embodiments, the boom assembly 354 includes more or fewer boom sections (e.g., one, three, five, etc.) and/or a different arrangement of boom sections.

As shown in FIG. 12, the boom assembly 354 includes a first actuator, shown as lower lift cylinder 364. The lower boom 360 is pivotally coupled (e.g., pinned, etc.) to the turntable 352 at a joint or lower boom pivot point. The lower lift cylinder 364 (e.g., a pneumatic cylinder, an electric linear actuator, a hydraulic cylinder, etc.) is coupled to the turntable 352 at a first end and coupled to the lower boom 360 at a second end. The lower lift cylinder 364 may be configured to raise and lower the lower boom 360 relative to the turntable 352 about the lower boom pivot point.

The boom assembly 354 further includes a second actuator, shown as upper lift cylinder 366. The upper boom 362 is pivotally coupled (e.g., pinned) to the upper end of the lower boom 360 at a joint or upper boom pivot point. The upper lift cylinder 366 (e.g., a pneumatic cylinder, an electric linear actuator, a hydraulic cylinder, etc.) is coupled to the upper boom 362. The upper lift cylinder 366 may be configured to extend and retract to actuate (e.g., lift, rotate, elevate, etc.) the upper boom 362, thereby raising and lowering a distal end of the upper boom 362.

Referring still to FIG. 12, the application kit 80 further includes an operator platform, shown as platform assembly 370, coupled to the distal end of the upper boom 362 by an extension arm, shown as jib arm 372. The jib arm 372 may be configured to pivot the platform assembly 370 about a lateral axis (e.g., to move the platform assembly 370 up and down, etc.) and/or about a vertical axis (e.g., to move the platform assembly 370 left and right, etc.).

The platform assembly 370 provides a platform configured to support one or more operators or users. In some embodiments, the platform assembly 370 may include accessories or tools configured for use by the operators. For example, the platform assembly 370 may include pneumatic tools (e.g., an impact wrench, airbrush, nail gun, ratchet, etc.), plasma cutters, welders, spotlights, etc. In some embodiments, the platform assembly 370 includes a control panel (e.g., a user interface, a removable or detachable control panel, etc.) configured to control operation of the boom lift 350 (e.g., the turntable 352, the boom assembly 354, etc.) from the platform assembly 370 or remotely. In other embodiments, the platform assembly 370 is omitted, and the boom lift 350 includes an accessory and/or tool (e.g., forklift forks, etc.) coupled to the distal end of the boom assembly 354.

G. Scissor Lift

Figure 13:
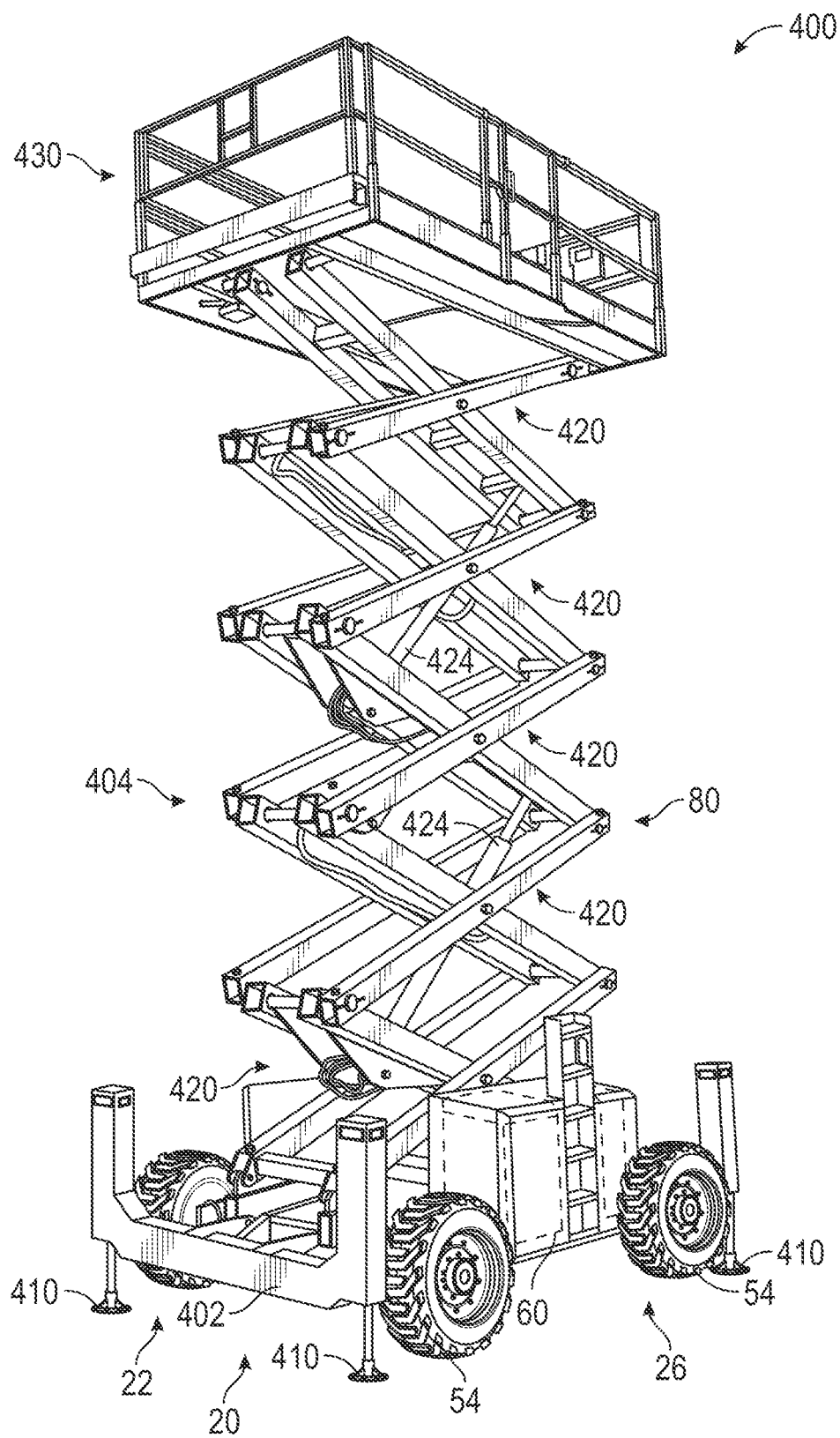
FIG. 13 is a perspective view of the vehicle of FIG. 1 configured as a scissor lift, according to an exemplary embodiment.

Referring now to FIG. 13, the vehicle 10 is configured as a lift device, shown as scissor lift 400. As shown in FIG. 13, the application kit 80 includes a body, shown as lift base 402, coupled to the chassis 20. The lift base 402 is coupled to a scissor assembly, shown as lift assembly 404, such that the lift base 402 supports the lift assembly 404. The lift assembly 404 is configured to extend and retract, raising and lowering between a raised position and a lowered position relative to the lift base 402.

As shown in FIG. 13, the lift base 402 includes a series of actuators, stabilizers, downriggers, or outriggers, shown as leveling actuators 410. The leveling actuators 410 may extend and retract vertically between a stored position and a deployed position. In the stored position, the leveling actuators 410 may be raised, such that the leveling actuators 410 do not contact the ground. Conversely, in the deployed position, the leveling actuators 410 may engage the ground to lift the lift base 402. The length of each of the leveling actuators 410 in their respective deployed positions may be varied in order to adjust the pitch (e.g., rotational position about a lateral axis) and the roll (e.g., rotational position about a longitudinal axis) of the lift base 402 and/or the chassis 20. Accordingly, the lengths of the leveling actuators 410 in their respective deployed positions may be adjusted to level the lift base 402 with respect to the direction of gravity (e.g., on uneven, sloped, pitted, etc. terrain). The leveling actuators 410 may lift the wheel and tire assemblies 54 off of the ground to prevent movement of the scissor lift 400 during operation. In other embodiments, the leveling actuators 410 are omitted.

The lift assembly 404 may include a series of subassemblies, shown as scissor layers 420, each including a pair of inner members and a pair of outer members pivotally coupled to one another. The scissor layers 420 may be stacked atop one another in order to form the lift assembly 404, such that movement of one scissor layer 420 causes a similar movement in all of the other scissor layers 420. The scissor layers 420 extend between and couple the lift base 402 and an operator platform (e.g., the platform assembly 430). In some embodiments, scissor layers 420 may be added to, or removed from, the lift assembly 404 in order to increase, or decrease, the fully extended height of the lift assembly 404.

Referring still to FIG. 13, the lift assembly 404 may also include one or more lift actuators 424 (e.g., hydraulic cylinders, pneumatic cylinders, electric linear actuators such as motor-driven leadscrews, etc.) configured to extend and retract the lift assembly 404. The lift actuators 424 may be pivotally coupled to inner members of various scissor layers 420, or otherwise arranged within the lift assembly 404.

A distal or upper end of the lift assembly 404 is coupled to an operator platform, shown as platform assembly 430. The platform assembly 430 may perform similar functions to the platform assembly 370, such as supporting one or more operators, accessories, and/or tools. The platform assembly 430 may include a control panel to control operation of the scissor lift 400. The lift actuators 424 may be configured to actuate the lift assembly 404 to selectively reposition the platform assembly 430 between a lowered position (e.g., where the platform assembly 430 is proximate to the lift base 402) and a raised position (e.g., where the platform assembly 430 is at an elevated height relative to the lift base 402). Specifically, in some embodiments, extension of the lift actuators 424 moves the platform assembly 430 upward (e.g., extending the lift assembly 404), and retraction of the lift actuators 424 moves the platform assembly 430 downward (e.g., retracting the lift assembly 404). In other embodiments, extension of the lift actuators 424 retracts the lift assembly 404, and retraction of the lift actuators 424 extends the lift assembly 404.

Braking Modes

Overview

Referring to FIGS. 14-18, the refuse vehicle 100 or the vehicle 10 may be operable in different modes (e.g., a driving or highway mode and a collection mode), according to some embodiments. When the refuse vehicle 100 is in the driving or highway mode, the refuse vehicle 100 can be controlled according to a first set of braking or speed parameters. When the refuse vehicle 100 is in the collection mode, the refuse vehicle 100 can be controlled according to a second set of braking or speed parameters. The collection mode facilitates simulation of an internal combustion engine to provide a baseline creep or speed of the refuse vehicle 100 even when an accelerator pedal (e.g., a gas pedal) is not pressed. The collection mode may facilitate collection of refuse or waste receptacles without requiring the operator or driver of the refuse vehicle 100 to press the accelerator pedal.

Driveline

Figure 14:
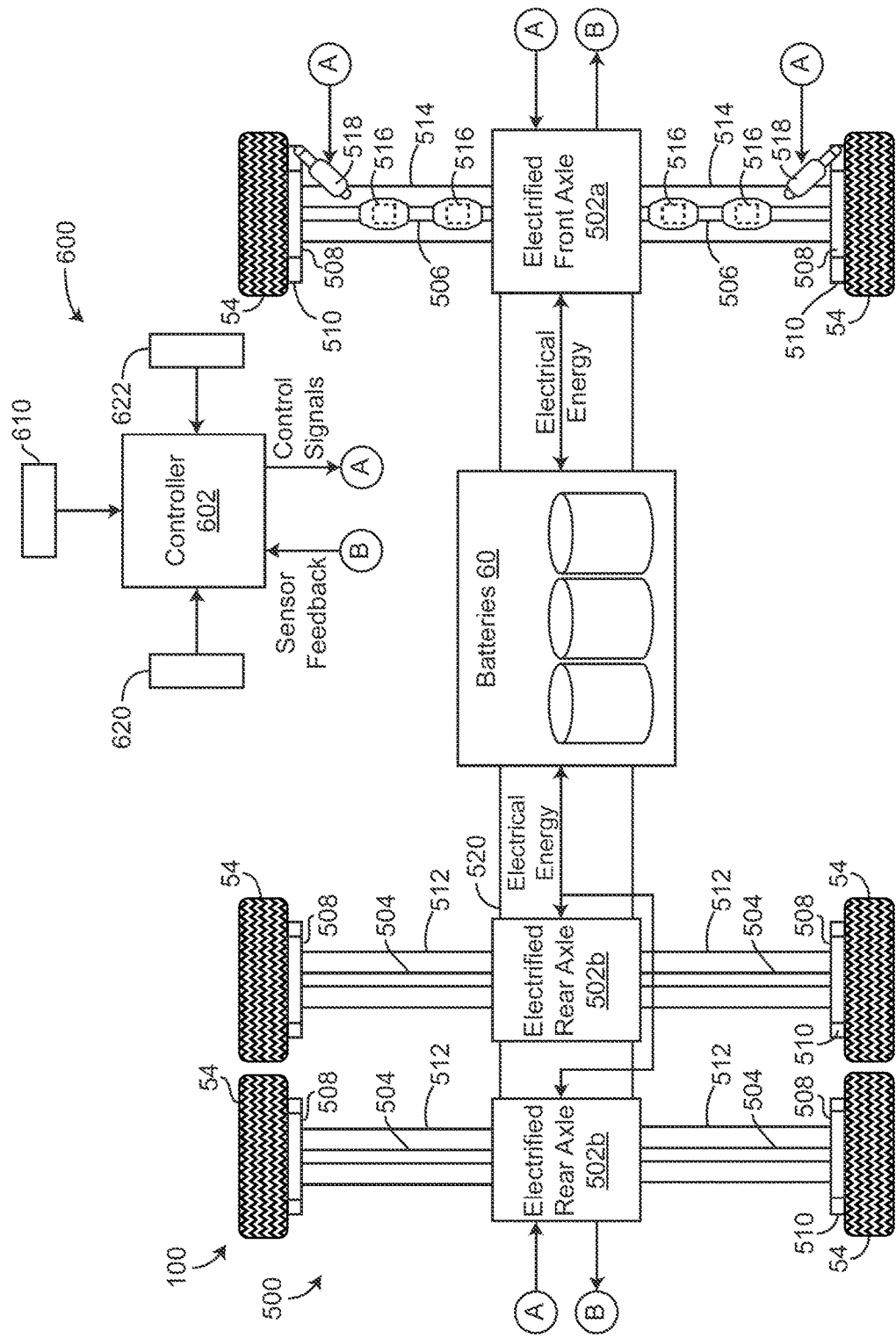
FIG. 14 is a block diagram of a driveline of an electric refuse vehicle, according to an exemplary embodiment.

FIG. 14 shows an exemplary driveline 500 (e.g., a chassis, a drivetrain, a transmission system, etc.) of the refuse vehicle 100, according to an exemplary embodiment. The driveline 500 of the vehicle 100 includes a frame 520 (e.g., a structural member, a longitudinal frame, a rail, a beam, etc.), an electrified front axle 502a, electrified rear axles 502b, the tire assemblies 54, a front axle support 514, and a pair of rear axle supports 512. In some embodiments, the front axle support 514 and the pair of rear axle supports 512 are portions of the frame 520 that extend laterally outwards from the frame 520. The wheel assemblies 54 can be positioned at ends of the front axle support 514 and the rear axle supports 512. The wheel assemblies 54 may include or be coupled with the front axle support 514 and the rear axle supports 512 through wheel hubs 510 (e.g., hub assemblies, support assemblies, etc.). In some embodiments, the wheel assemblies 54 include or are coupled with brakes 508 (e.g., friction brakes, disc brakes, drum brakes, air brakes, etc.) that are configured to exert a braking force (e.g., a torque) on the wheel assemblies 54 to slow a speed of the refuse vehicle 100 or to stop the refuse vehicle 100.

The driveline 500 also includes batteries 60 that are configured to provide electrical power to the electrified front axle 502a and/or the electrified rear axles 502b. The electrified front axle 502a and the electrified rear axles 502b are configured to consume electrical energy provided by the batteries 60 and drive the wheel assemblies 54 to rotate through shafts 504 and 506 to transport the refuse vehicle 100. In some embodiments, the shaft 506 for the front wheel assemblies 54 includes multiple sections that are rotatably coupled with each other through universal joints 516. In some embodiments, the shafts 506, the universal joints 516, and the front axle support 514 may be components of the electrified front axle 502a. Similarly, the shafts 504 and the rear axle supports 512 may be components of the electrified rear axles 502b. In some embodiments, the electrified front axle 502a is optional and only the electrified rear axles 502b are used.

In some embodiments, the driveline 500 is the same as or similar to any of the drivelines or chassis described in greater detail in U.S. patent application Ser. No. 17/514,540, filed Oct. 29, 2021, the entire disclosure of which is incorporated by reference herein.

Referring still to FIG. 14, the electrified front axle 502a and the electrified rear axles 502b can be configured to perform regenerative braking to slow the refuse vehicle 10 and charge the batteries 60. In some embodiments, the electrified front axle 502a and the electrified rear axles 502b are configured to transition between operating as an electric motor (e.g., to drive the wheel assemblies 54 for transportation of the refuse vehicle 100) and operating as an electric generator (e.g., to be driven by the wheel assemblies 54 to slow the speed of the refuse vehicle and to generate electricity that can be used to charge the batteries 60). In some embodiments, the driveline 500 includes a steering system, shown as steering actuators 518. The steering actuators 518 can be configured to drive the wheel assemblies 54 (e.g., the hub assemblies 510, the brakes 508, and the wheel assemblies 54) to rotate or pivot relative to the axle support 514 for steering.

Referring still to FIG. 14, the driveline 500 includes or is configured for use with a control system 600. The control system 600 includes a controller 602, an accelerator pedal 610, a steering wheel 620, and a brake pedal 622. The controller 602 is configured to receive a steering input from the steering wheel 620 and generate control signals for the steering actuators 518 to perform a steering operation for the refuse vehicle 100, according to some embodiments. In some embodiments, the controller 602 is configured to receive a braking input from the brake pedal 622 and generate control signals or operate the brakes 508 according to the braking input. In some embodiments, the controller 602 is configured to receive the braking input from the brake pedal 622 and generate control signals or operate at least one of the electrified front axle 502a or the electrified rear axles 502b to perform regenerative braking. In some embodiments, the controller 602 is configured to receive an acceleration input from the accelerator 610 and generate control signals or operate the electrified front axle 502a and the electrified rear axles 502b based on the acceleration input. In some embodiments, the controller 602 is configured to receive feedback or sensor data from the electrified front axle 502a and/or the electrified rear axles 502b and use the feedback to operate the electrified front axle 502a, the electrified rear axles 502b, or the brakes 508.

Control System

Figure 15:
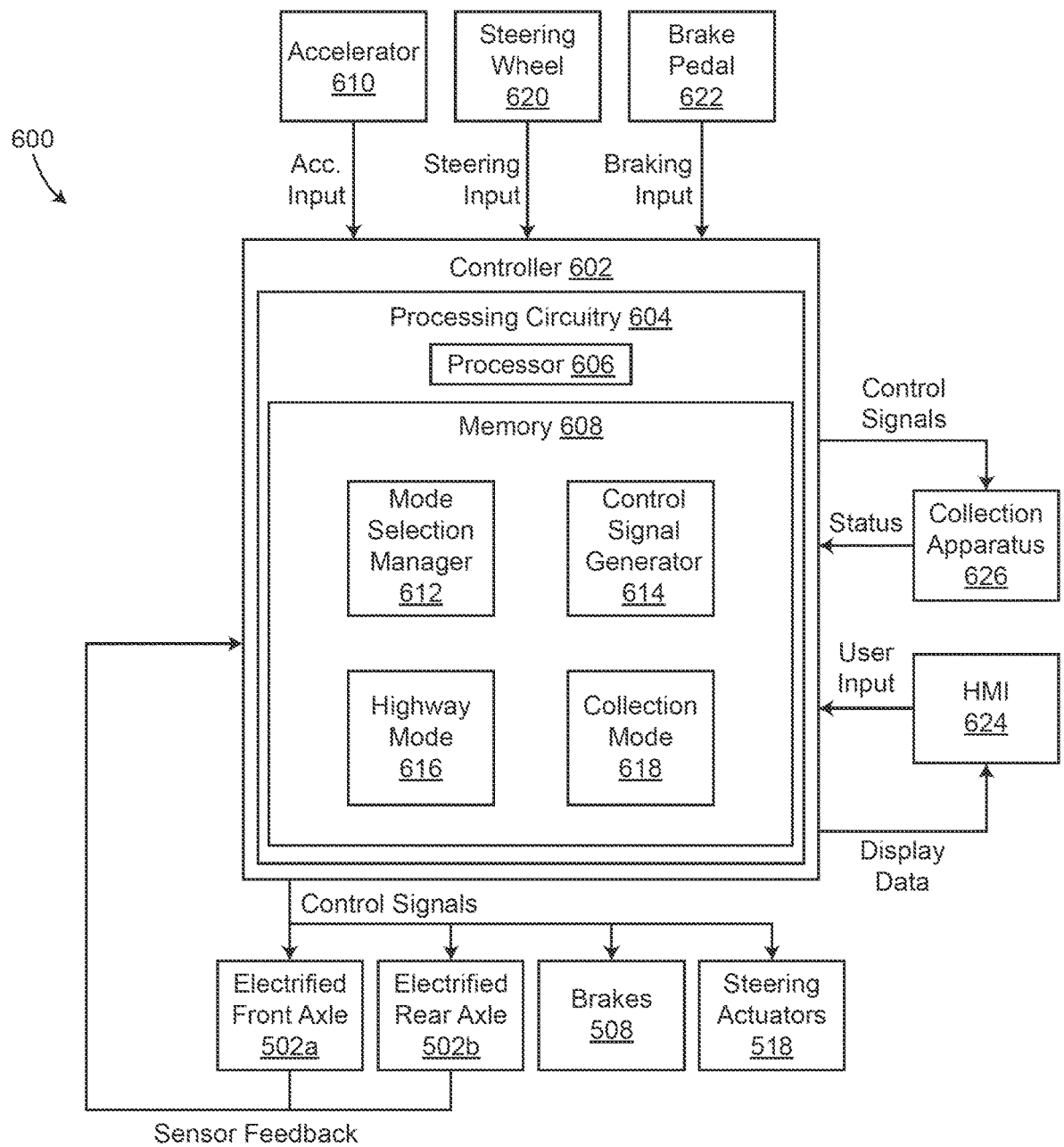
FIG. 15 is a block diagram of a control system of the electric refuse vehicle of FIG. 14 for operating the electric refuse vehicle according to a highway mode and a collection mode, according to an exemplary embodiment.

Referring to FIG. 15, the control system 600 includes the controller 602, configured to receive an acceleration input from the accelerator 610, the steering input from the steering wheel 620, the braking input from the brake pedal 622, and sensor feedback from any of the electrified front axle 502a or the electrified rear axles 502b. The controller 602 is configured to determine control signals or control decisions for any of the electrified front axle 502a, the electrified rear axles 502b, the brakes 508, or the steering actuators 518 based on any of, or any combination of the acceleration input, the steering input, or the braking input. The controller 602 can be configured to operate between different modes and generate control signals for the electrified front axle 502a, the electrified rear axles 502b, the brakes 508, or the steering actuator 518 based on a currently selected mode. In some embodiments, the controller is transitionable between a driving or highway mode and a collection mode. The controller 602 is also configured to receive a user input from a human machine interface (HMI) 624, according to some embodiments. In some embodiments, the HMI 624 includes any buttons, levers, switches, touch screens, etc. The HMI 624 can be positioned within the cab 40 so that the operator or driver of the refuse vehicle 100 can provide user inputs. The user input may be a selection of a desired mode of operation for the refuse vehicle 100, or may be a command to transition between different modes.

The controller 602 includes processing circuitry 604, a processor 606, and memory 608. Processing circuitry 604 can be communicably connected to a communications interface such that processing circuitry 604 and the various components thereof can send and receive data via the communications interface. Processor 606 can be implemented as a general purpose processor, an application specific integrated circuit (ASIC), one or more field programmable gate arrays (FPGAs), a group of processing components, or other suitable electronic processing components.

Memory 608 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 608 can be or include volatile memory or non-volatile memory. Memory 608 can include database components, object code components, script components, or any other type of information structure for supporting the various activities and information structures described in the present application. According to some embodiments, memory 608 is communicably connected to processor 606 via processing circuitry 604 and includes computer code for executing (e.g., by processing circuitry 604 and/or processor 606) one or more processes described herein.

In some embodiments, controller 602 is implemented within a single computer (e.g., one server, one housing, etc.). In various other embodiments controller 602 can be distributed across multiple servers or computers (e.g., that can exist in distributed locations).

The memory 608 includes a mode selection manager 612, a control signal generator 614, a highway mode 616 (e.g., a transit mode), and a collection mode 618, according to some embodiments. The mode selection manager 612 is configured to use any of the acceleration input, the steering input, the braking input, the sensor feedback, or the user input to transition between or select one of the highway mode 616 or the collection mode 618.

In some embodiments, the user input is a selection of one of the highway mode 616 or the collection mode 618. The mode selection manager 612 can be configured to receive the user input and transition between the highway mode 616 and the collection mode 618 according to the user input. In some embodiments, the controller 602 is configured to provide display data to the HMI 624 so that the HMI 624 operates to display a current mode (e.g., an active one of the highway mode 616 or the collection mode 618), and provides a visual or aural alert to the user (e.g., via a display screen, light emitting diodes (LEDs), speakers, etc., positioned within the cab 40) so that the user or driver is informed regarding the current mode and is informed regarding a transition between modes (e.g., activating a light while the transition between the modes takes place). In some embodiments, the HMI 624 changes a graphical user interface (GUI) or display arrangement responsive to the current mode (e.g., a different user interface for the highway more 616 and a different user interface for the collection mode 618).

In some embodiments, the mode selection manager 612 is configured to automatically determine when to transition between the highway mode 616 and the collection mode 618. In some embodiments, the mode selection manager 612 is configured to obtain information from the electrified front axle 502a and the electrified rear axles 502b indicating a current speed of the refuse vehicle 100. In some embodiments, the mode selection manager 612 compares the current speed v of the refuse vehicle 100 to a threshold speed $V_{threshold}$. If the current speed v of the refuse vehicle 100 is greater than the threshold speed $V_{threshold}$, the mode selection manager 612 can transition the refuse vehicle 100 out of the collection mode 618 and into the highway mode 616. If the current speed v of the refuse vehicle 100 is less than the threshold speed $V_{threshold}$, the mode selection manager 612 transitions the refuse vehicle 100 into the collection mode 618.

In some embodiments, the mode selection manager 612 is configured to automatically transition the refuse vehicle 100 between the collection mode 618 and the highway mode 616 based on whether a loading apparatus of the refuse vehicle 100 is activated or if a collection function is activated. In some embodiments, the mode selection manager 612 is configured to identify if the collection function is activated based on the user input received from the HMI 624. For example, if the user input received from the HMI 624 indicates that a collection apparatus of the refuse vehicle 100 should be operated (e.g., the lift assembly 140, the lift assembly 160, etc.), the mode selection manager 612 may determine that refuse vehicle 100 should be transitioned into the collection mode 618. In some embodiments, the controller 602 and the mode selection manager 612 are configured to receive feedback from a collection apparatus 626 (e.g., the lift assembly 140, the lift assembly 160, etc.) indicating a status of the collection apparatus 626. In some embodiments, the mode selection manager 612 uses the status of the collection apparatus 626 (e.g., whether or not the collection apparatus 626 is activated) to determine if the refuse vehicle 100 should be transitioned between the highway mode 616 or the collection mode 618. In some embodiments, the control signal generator 614 of the controller 602 is also configured to generate control signals for the collection apparatus 626 according to the user input (e.g., after the refuse vehicle 100 has been transitioned into the collection mode 618).

In some embodiments, the collection mode 618 and the highway mode 616 include operating the electrified front axle 502a, the electrified rear axles 502b, and the brakes 508 according to different braking parameters of the highway mode 616 and the collection mode 618. In some embodiments, the braking parameters include a degree to which the brakes 508 should exert braking force for the tire assemblies 54. In some embodiments, the braking parameters of the collection mode 618 and the highway mode 616 include determining if the electrified front axle 502a or the electrified rear axles 502b should perform regenerative braking (e.g., when the operator lifts their foot off the accelerator 610 such that the accelerator is not depressed), and an amount of regenerative braking that should be performed by the electrified front axle 502a and the electrified rear axles 502b.

In some embodiments, the electrified front axle 502a and the electrified rear axles 502b are configured to operate to provide a certain baseline operation of the refuse vehicle 100 (e.g., a creep) when the refuse vehicle 100 is in the collection mode 618. In some embodiments, when the refuse vehicle 100 is in the collection mode 618, the control signal generator 614 is configured to use the accelerator input provided by the accelerator 610 to operate the electrified front axle 502a and the electrified rear axles 502b to transport the refuse vehicle 100. In some embodiments, the accelerator input is a value that has a range of values (e.g., from $\alpha=0$ to $\alpha=\alpha_{high}$ where 0 indicates that the accelerator 610 is not depressed at all, and $\alpha_{high}$ indicates that the accelerator 610 is depressed fully). In some embodiments, when the refuse vehicle 100 is in the collection mode 618, the control signal generator 614 is configured to operate the electrified front axle 502a and/or the electrified rear axles 502b to provide a baseline speed of the refuse vehicle 100 even when $\alpha=0$ so that when the operator lifts their foot off the brake pedal 622 (and does not depress the accelerator 610 at all), the electrified front axle 502a and/or the electrified rear axles 502b drive the refuse vehicle 100 to transport at the baseline speed (e.g., to creep forward at a low speed). Advantageously, transporting the baseline speed by operating the electrified front axle 502a and/or the electrified rear axles 502b facilitates performing collection operations and transporting to a next refuse container without requiring use of the accelerator 610. For example, the operator may simply press the brake pedal 622, thereby decelerating the refuse vehicle 100, operating the collection apparatus 626, and then letting off the brake pedal 622 so that the refuse vehicle 100 transports to the next stop.

In some embodiments, the refuse vehicle 100 is configured to use regenerative braking when in the collection mode 618. When the refuse vehicle 100 is in the collection mode 618 and the operator presses the brake pedal 622, the control signal generator 614 can provide control signals to the electrified front axle 502a and/or the electrified rear axles 502b so that the electrified front axle 502a and the electrified rear axles 502b operate as generators to generate electrical energy (e.g., to charge the batteries 60) and to provide drag to the wheel assemblies 54 to slow or decelerate the refuse vehicle 100. In some embodiments, regenerative braking is used for the collection mode 618 since the refuse vehicle 100 is expected to brake often, and come to a complete stop often (e.g., at each collection stop along the route). In some embodiments, if the highway mode 616 also uses regenerative braking, a setting of the regenerative braking for the collection mode 618 is such that more regenerative braking is applied to the wheel assemblies 54 in the collection mode 618 than in the highway mode 616. In some embodiments, the control signal generator 614 is configured to operate both the brakes 508 and the electrified front axle 502a and the electrified rear axles 502b to provide both regenerative braking and friction braking. In some embodiments, a charge level of the batteries 60 is used to determine if regenerative braking or friction braking should be used in the collection mode 618. For example, if the batteries 60 are at a full charge, then friction braking alone may be used to slow the refuse vehicle 100 when the operator presses the brake pedal 622. In some embodiments, if the batteries 60 are not at a full charge, then regenerative braking can be used by operating the electrified front axle 502a and/or the electrified rear axles 502b. In some embodiments, both regenerative braking and friction braking are used by operating the electrified front axle 502a, the electrified rear axles 502b, and the brakes 508. In some embodiments, a proportion of regenerative braking to friction braking is determined by the control signal generator 614 based on the charge level of the batteries 60.

In some embodiments, when the refuse vehicle 100 is in the highway mode 616, the control signal generator 614 is configured to use a different set of braking parameters and a different set of parameters for the electrified front axle 502a and the electrified rear axles 502b. In some embodiments, the creep functions described in greater detail above with reference to the collection mode 618 are disabled when in the highway mode 616. In some embodiments, letting off the accelerator 610 in the highway mode 616 does not result in automatic regenerative braking of the refuse vehicle 100. In some embodiments, in the highway mode 616, the control signal generator 614 is configured to operate the electrified front axle 502a and the electrified rear axles 502b according to the accelerator input provided by the accelerator 610 without applying a creep or baseline speed (by operating the electrified front axle 502a and the electrified rear axles 502b) when the operator takes their foot off the accelerator 610. In some embodiments, the controller 602 is configured to operate the electrified front axle 502a and/or the electrified rear axles 502b to provide regenerative braking at a lesser degree than in the collection mode 618 when the refuse vehicle 100 is operated according to the highway mode 616. In some embodiments, the braking used during the highway mode 616 (e.g., in response to depressing the brake pedal 622) includes using regenerative braking (e.g., by operating the electrified front axle 502a and the electrified rear axles 502b) with a lesser amount of regenerative braking (e.g., a lower amount of braking force resistant to the forward motion of the wheel assemblies 54) than the regenerative braking that is used in the collection mode 618 responsive to depressing the brake pedal 622.

In general, the highway mode 616 and the collection mode 618 can differ in that the highway mode 616 and the collection mode 618 have different associated braking parameters. In some embodiments, creep and/or coast functions are enabled or disabled in the highway mode 616 or the collection mode 618. In some embodiments, a creep function includes applying a small positive torque to the electrified front axle 502a and the electrified rear axles 502b when the refuse vehicle 100 is below a creep torque speed (e.g., less than 10 mph), and both (i) the accelerator 610 is not pressed, and (ii) the brake pedal 622 is being released, in order to achieve a creep speed (e.g., the baseline speed). In some embodiments, a speed of the refuse vehicle 100 is controlled based on (e.g., proportional to) a current depression amount of the brake pedal 622. In some embodiments, the creep function may apply to the mixer truck 200 so that the mixer truck 200 pulls forward at a constant or baseline speed while pouring concrete. In some embodiments, the creep function is activated when the collection mode 618 is active. In some embodiments, the creep function is deactivated when the collection mode 618 is not active (e.g., when the highway mode 616 is active).

In some embodiments, the coast function includes providing a negative torque signal to the electrified front axle 502a and the electrified rear axles 502b (e.g., performing regenerative braking) when the refuse vehicle 100 is above the creep torque speed (e.g., 10 mph, the baseline speed), and both (i) the accelerator 610 is not depressed, and (ii) the brake pedal 622 is not depressed in order to gradually slow or decelerate the refuse vehicle 100. In some embodiments, a magnitude of the negative torque indicated by the negative torque signal differs when in the highway mode 616 or the collection mode 618 with the negative torque signal indicating a greater negative torque when the refuse vehicle 100 is in the collection mode 618 relative to the highway mode 616. In some embodiments, the refuse vehicle 100 is operated using both the creep functionality and the coast braking functionality (e.g., in the collection mode 618) such that the refuse vehicle 100 automatically moves toward the creep torque speed (e.g., 10 mph) regardless of if the refuse vehicle 100 is currently above or below the creep torque speed. In some embodiments, the coast function also includes operating the friction brakes 508 to provide negative torque (e.g., braking torque). In some embodiments, the coast function is active during both the highway mode 616 and the collection mode 618, but with different degree of negative torque (e.g., braking) applied when the brake pedal 622 is pressed (e.g., different braking parameters or settings).

In some embodiments, a degree of depression of the brake pedal 622 indicates a load or a desired braking amount (e.g., an amount of resistive torque that should be applied to the wheel assemblies 54). The braking input provided by the brake pedal 622 can be used by the control signal generator 614 to determine an amount of braking that should be provided to the wheel assemblies 54 (e.g., by operation of the electrified front axle 502a, operation of the electrified rear axles 502b, operation of the brakes 508, etc.). In some embodiments, the braking provided to the wheel assemblies 54 is related to (e.g., exponentially, linearly, etc.) the braking input indicated by the depression of the brake pedal 622. In some embodiments, a relationship between the braking provided to the wheel assemblies 54 and the braking input is different when operating in the highway mode 616 as compared to operating in the collection mode 618. For example, the braking provided to the wheel assemblies 54 may be higher in the collection mode 618 than the braking provided to the wheel assemblies 54 in the highway mode 616 for a similar braking input. In some embodiments, a slope of the relationship between the braking input and the braking provided to the wheel assemblies 54 is greater for the collection mode 618 than the highway mode 616. In some embodiments, both the highway mode 616 and the collection mode 618 have a same braking amount when the brake pedal 622 is fully depressed or depressed beyond a certain point.

In some embodiments, the braking provided to the wheel assemblies 54 based on the braking input indicated by the brake pedal 622 is a combination of both regenerative braking (e.g., by operating the electrified front axle 502a and the electrified rear axles 502b) and friction braking (e.g., by operating the brakes 508). For example, in the highway mode 616, the braking can be performed using parameters including a first percentage of regenerative braking $p_{1,highway}$ and a second percentage of friction braking $p_{2,highway}$ (e.g., where $p_{2,highway}+p_{2,highway}=1.0$). The braking input can be used to determine a braking load using a function or relationship $f_{highway}$ for the highway mode 616, (e.g., $brake_{load}=f_{highway}(brake_{input})$) The braking provided to the wheel assemblies 54 may be determined as:

$$brake_{load}=brake_{regen}+brake_{friction}=brake_{load}p_{1,highway}+brake_{load}p_{2,highway}$$

The braking load, $brake_{load}$ can be a unit of counter torque, resistive torque, braking energy, braking torque, braking force, etc., applied to the wheel assemblies 54. The braking load $brake_{load}$ and the known braking parameters $p_{1,highway}$ and $p_{2,highway}$ can be used to determine the load of regenerative braking $brake_{regen}$ and the load of friction braking $brake_{friction}$ that should be provided. In some embodiments, the braking parameter $p_{1,highway}$ for the regenerative braking for the highway mode 616 is less than a corresponding braking parameter $p_{2,collection}$ for regenerative braking in the collection mode 618. In some embodiments, the relationship $f_{highway}$ when in the highway mode 616 results in lower braking loads $brake_{load}$ for a given braking input $brake_{input}$ when compared to a relationship $f_{collection}$ and the correspondingly determined braking load $brake_{load}$ for the same braking input $brake_{input}$ when in the collection mode 618. In some embodiments, this is achieved by performing more aggressive regenerative braking in the collection mode 618 as compared to the highway mode 616 by operating the electrified front axle 502a and/or the electrified rear axles 502b.

The collection mode 618 can similarly include using the braking input, $brake_{input}$ to determine a corresponding braking load $brake_{load}$ using the relationship for the collection mode 618 $f_{collection}$ (e.g., $brake_{load}=f_{collection}(brake_{input})$). In some embodiments, the braking provided to the wheel assemblies 54 is determined as:

$$brake_{load}=brake_{regen}+brake_{friction}=brake_{load}p_{1,collection}+brake_{load}p_{2,collection}$$

where $p_{1,collection}$ is a parameter indicating a proportion or percentage of the braking that should be provided by regenerative braking (e.g., by operating the electrified front axle 502a and/or the electrified rear axles 502b), and $p_{2,collection}$ is a parameter indicating a proportions or percentage of the braking that should be provided by friction braking (e.g., where $p_{1,collection}+p_{2,collection}=1.0$). In some embodiments, the parameter for the regenerative braking in the collection mode 618 $p_{1,collection}$, is greater than the parameter for the regenerative braking in the highway mode 616, $p_{1,highway}$ (i.e., $p_{1,collection}>p_{1,highway}$).

Processes

Figure 16:
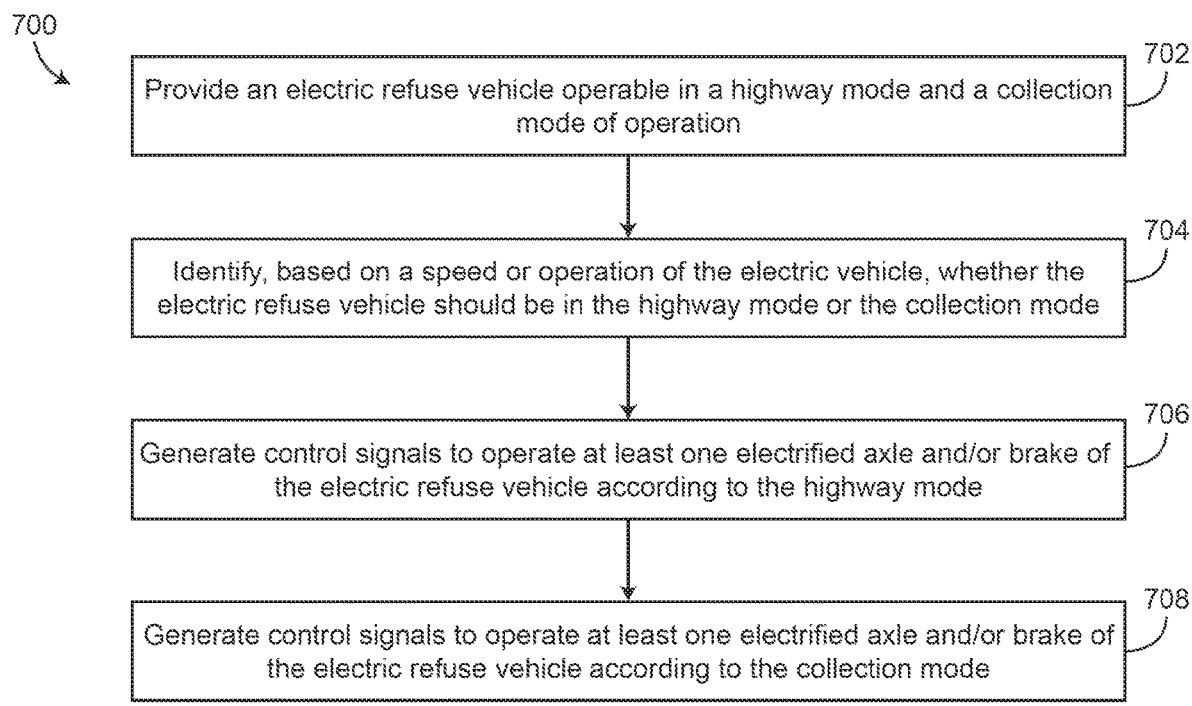
FIG. 16 is a flow diagram of a process for transitioning a vehicle between a driving or highway mode and a collection mode, according to an exemplary embodiment.

Referring to FIG. 16, a process 700 for automatically transitioning a refuse vehicle between different modes (e.g., a collection mode and a highway or driving mode) is shown, according to some embodiments. In some embodiments, process 700 includes steps 702-708 and can be performed at least partially by the control system 600. In some embodiments, process 700 is performed to automatically transition braking settings for collection and driving operations of the refuse vehicle. In some embodiments, process 700 is applicable to the refuse vehicle 100.

Process 700 includes providing an electric refuse vehicle operable in a highway mode and a collection mode of operation (step 702), according to some embodiments. In some embodiments, the electric refuse vehicle is the refuse vehicle 100. In some embodiments, the electric refuse vehicle is operable in the highway mode and the collection mode of operation, which includes operating braking operations of the electric refuse vehicle according to different braking settings or parameters.

Process 700 includes identifying, based on a speed or operation of the electric refuse vehicle, whether the electric refuse vehicle should be in the highway mode or the collection mode (step 704), according to some embodiments. In some embodiments, step 704 is performed by the controller 602, or more particularly, by the mode selection manager 612. In some embodiments, step 704 includes monitoring a current speed of the electric refuse vehicle and comparing the current speed to a threshold speed. If the current speed of the electric refuse vehicle is greater than the threshold, step 704 can include determining that the electric refuse vehicle should be operated in the highway mode. If the current speed of the electric refuse vehicle is less than (or less than or equal to) the threshold, step 704 can include determining that the electric refuse vehicle should be operated in the collection mode. In some embodiments, the threshold is a threshold speed such as 10 mph, 15 mph, etc. In some embodiments, step 704 includes monitoring an activation of a lift arm, lift apparatus, tailgate apparatus, etc., of the electric refuse vehicle (e.g., the lift assembly 140, the lift assembly 160, etc.), or monitoring a user input that indicates a command to operate the lift arm, lift apparatus, tailgate apparatus, etc., of the electric refuse vehicle. In some embodiments, if the lift arm, the lift apparatus, the tailgate apparatus, etc., of the electric vehicle is activated, or if the user input indicates that the lift arm, lift apparatus, tailgate apparatus, etc., is commanded to be operated, step 704 includes determining that the electric refuse vehicle should be transitioned into the collection mode.

Process 700 includes generating control signals to operate at least one electrified axle of the electric refuse vehicle and/or a brake of the electric refuse vehicle according to the highway mode (step 706), and generating control signals to operate at least one electrified axle of the electric refuse vehicle and/or the brake of the electric refuse vehicle according to the collection mode (step 708), according to some embodiments. In some embodiments, step 706 or step 708 are performed in response to step 704 (e.g., depending on which of the collection or the highway mode is currently active). In some embodiments, steps 706 and 708 are both performed by the control signal generator 614 based on inputs from the accelerator 610, and the accelerator 610. In some embodiments, the electrified axles (e.g., the electrified front axle 502a and the electrified rear axles 502b) and the brakes (e.g., brakes 508) are operated according to whichever of the collection mode or the highway mode is currently active.

Figure 17:
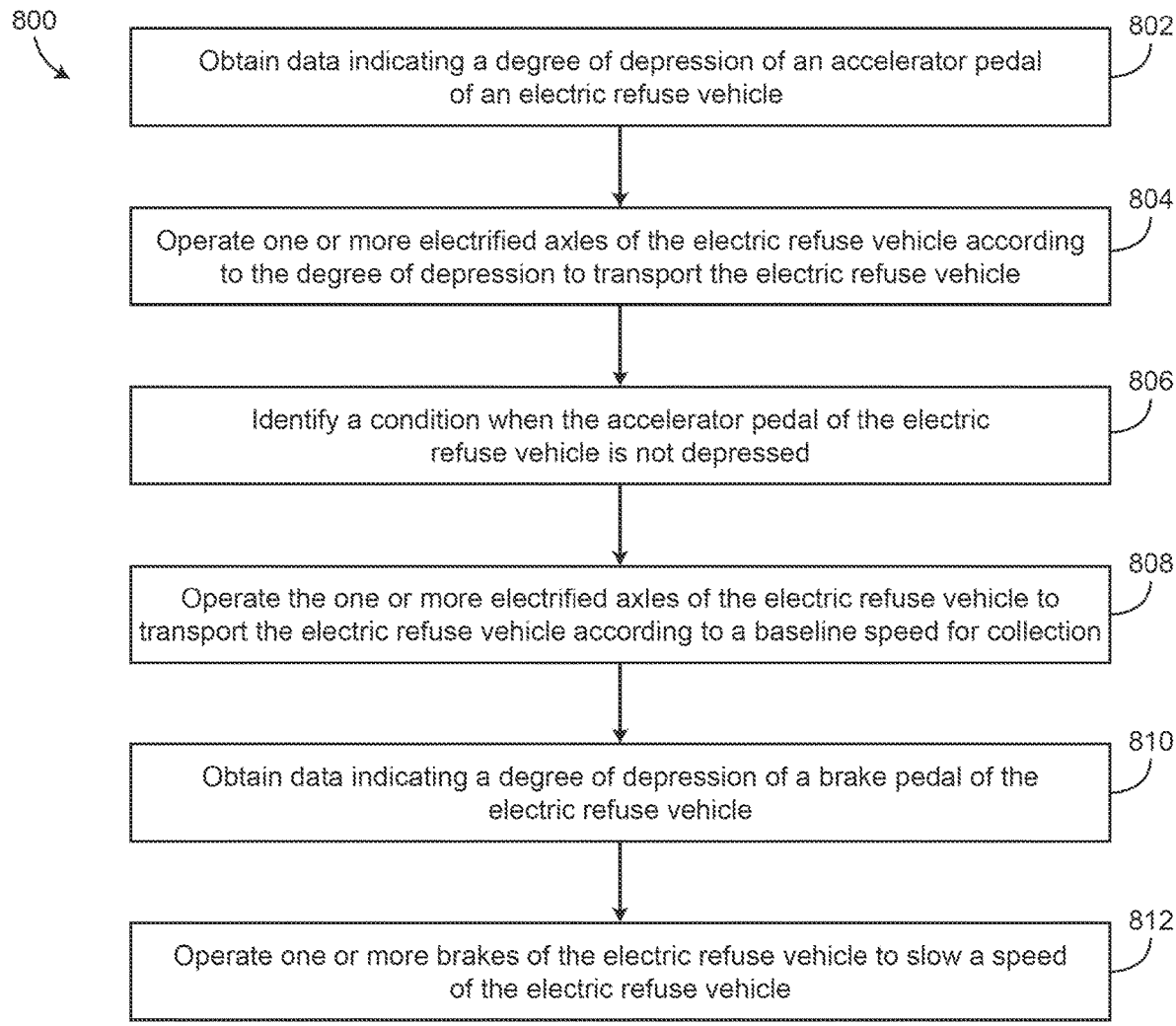
FIG. 17 is a flow diagram of a process for operating a vehicle according to a collection mode, according to an exemplary embodiment.

Referring to FIG. 17, a process 800 for operating an electric refuse vehicle according to a collection mode of operation includes steps 802-812, according to some embodiments. In some embodiments, process 800 is performed as step 708 of process 700. In some embodiments, process 800 includes operating the refuse vehicle according to the braking settings (and/or other settings or features) of the collection mode (e.g., the collection mode 618).

Process 800 includes obtaining data indicating a degree of depression of an accelerator pedal of an electric refuse vehicle (step 802), according to some embodiments. In some embodiments, the data indicates how far the accelerator pedal (e.g., the accelerator 610) is depressed, which corresponds to a speed or acceleration or driving torque for the electric refuse vehicle. In some embodiments, step 802 is performed by the accelerator 610 and the control signal generator 614. In some embodiments, step 802 includes obtaining data indicating a rate of change of the depression of the accelerator pedal, and the rate of change of the depression of the accelerator pedal is used in place of or in addition to the degree of depression of the accelerator pedal in process 800.

Process 800 includes operating one or more electrified axles of the electric refuse vehicle according to the degree of depression of the accelerator pedal to transport the electric refuse vehicle (step 804), according to some embodiments. In some embodiments, step 804 includes generating control signals for the electrified axles (e.g., the electrified front axle 502a and the electrified rear axles 502b) to cause the electrified axles to transport at a speed corresponding to the degree of depression of the accelerator pedal. In some embodiments, step 804 is performed by the control signal generator 614 based on the accelerator input provided by the accelerator 610.

Process 800 includes identifying a condition when the accelerator pedal of the electric refuse vehicle is not depressed (step 806), according to some embodiments. In some embodiments, step 806 is performed by the controller 602 or the control signal generator 614 based on the accelerator input provided by the accelerator 610. In some embodiments, step 806 includes identifying, based on the accelerator input of the accelerator 610, that the accelerator 610 is not being depressed, or is substantially not being depressed.

Process 800 includes operating the one or more electrified axles of the electric refuse vehicle to transport the electric refuse vehicle according to a baseline speed for collection (step 808), according to some embodiments. In some embodiments, steps 806 and 808 act as a creep function so that the electric refuse vehicle creeps forwards at a particular speed (e.g., the baseline speed, such as 5 mph) when the accelerator 610 is not depressed. In some embodiments, step 808 is performed by the control signal generator 614. In some embodiments, step 808 includes providing a control signal to the electrified front axle 502a and/or the electrified rear axles 502b so that the electric refuse vehicle (e.g., the refuse vehicle 100) continues to transport forwards at a constant speed, even when the accelerator pedal is not depressed.

Process 800 includes obtaining data indicating a degree of depression of a brake pedal of the electric refuse vehicle (step 810), according to some embodiments. In some embodiments, step 810 includes obtaining or receiving the braking input from the brake pedal 622. In some embodiments, step 810 includes determining a braking load that should be applied based on the braking input and a relationship (e.g., a function, an equation, etc.) for the collection mode.

Process 800 includes operating one or more brakes of the electric refuse vehicle to slow a speed of the electric refuse vehicle (step 812), according to some embodiments. In some embodiments, step 812 includes operating the brakes 508 of the electric refuse vehicle according to the degree of depression of the brake pedal of the electric refuse vehicle. In some embodiments, step 812 includes operating the one or more electrified axles of the electric refuse vehicle (e.g., the electrified front axle 502a and the electrified rear axles 502b) to provide regenerative braking according to the degree of depression of the brake pedal. In some embodiments, step 812 includes operating both the brakes (e.g., the friction brakes 508) and the electrified axles (e.g., the electrified front axle 502a and the electrified rear axles 502b) so that both friction braking and regenerative braking are used to slow the electric refuse vehicle according to the degree of depression of the brake pedal.

Figure 18:
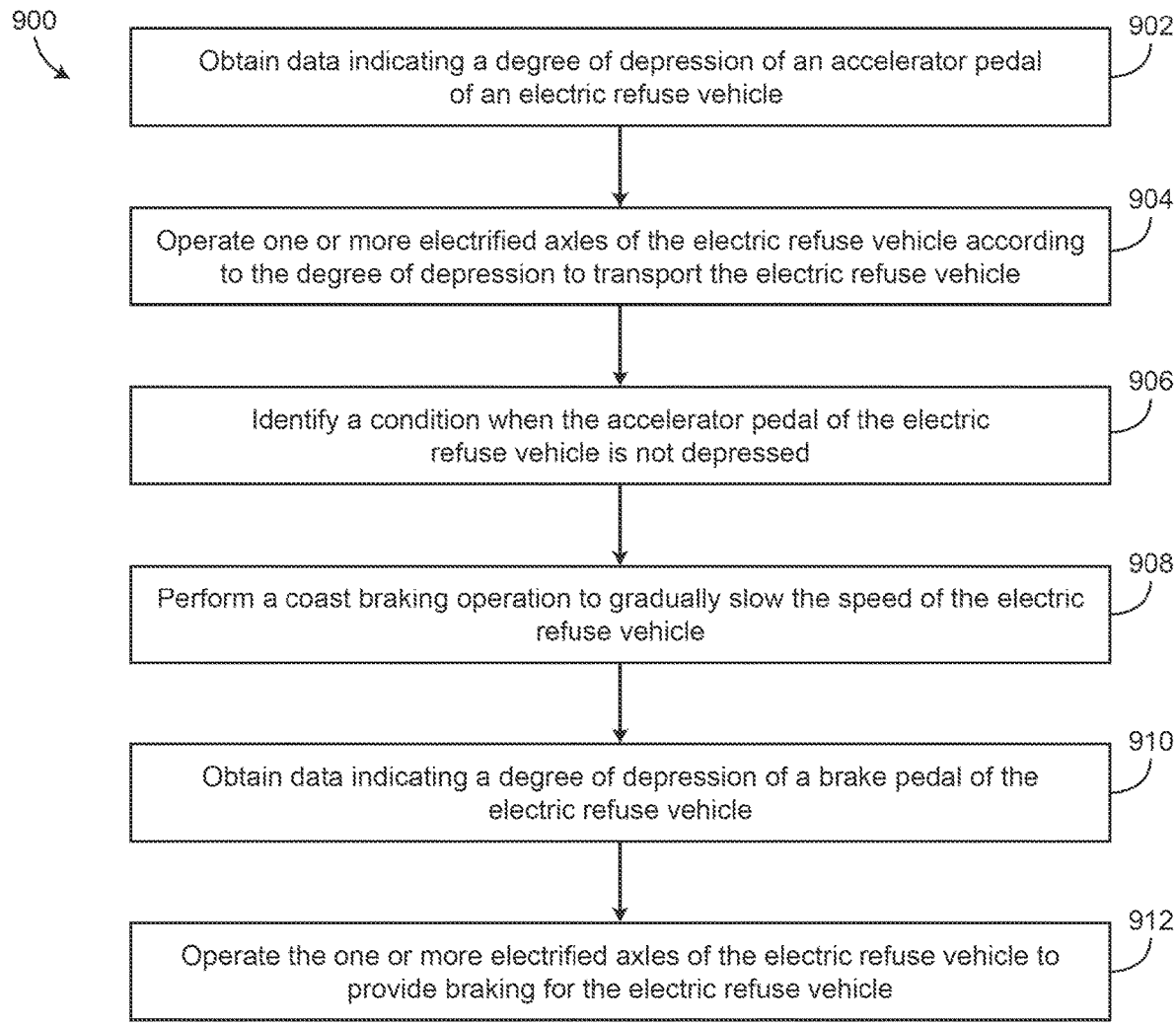
FIG. 18 is a flow diagram of a process for operating a vehicle according to a highway mode, according to an exemplary embodiment.

Referring to FIG. 18, a process 900 for operating an electric refuse vehicle according to a highway mode of operation includes steps 902-912, according to some embodiments. In some embodiments, the process 900 is performed as the step 706 of the process 700. In some embodiments, process 900 is performed any time the electric refuse vehicle is not in the collection mode.

Process 900 includes obtaining data indicating a degree of depression of an accelerator pedal of an electric refuse vehicle (step 902) and operating one or more electrified axles of the electric refuse vehicle according to the degree of depression of the accelerator pedal to transport the electric refuse vehicle (step 904), according to some embodiments. In some embodiments, steps 902 and 904 are the same as or similar to steps 802 and 804 of the process 800. Process 900 also includes identifying a condition when the accelerator pedal of the electric refuse vehicle is not depressed (step 906), according to some embodiments. In some embodiments, step 906 is the same as or similar to the step 806 of the process 800.

Process 900 includes performing a coast braking operation to gradually slow the speed of the electric refuse vehicle (step 908) in response to the condition when the accelerator pedal of the electric refuse vehicle is not depressed, according to some embodiments. In some embodiments, step 908 includes operating the electrified axles (e.g., the electrified front axle 502a and the electrified rear axles 502b) to provide regenerative braking at a lower degree than in step 812 of process 800. In some embodiments, step 908 includes providing a control signal to the electrified axles so that the electrified axles operate to provide a counter torque. In some embodiments, the degree of coast braking as performed in step 908 mimics an amount of drag or braking that occurs in a refuse vehicle with an internal combustion engine, so that the driving experience of the electric refuse vehicle is similar to a driving experience of an internal combustion engine (e.g., diesel) refuse vehicle.

Process 900 includes obtaining data indicating a degree of depression of a brake pedal of the electric refuse vehicle (step 910), according to some embodiments. In some embodiments, step 910 is the same as or similar to step 810 of process 800.

Process 900 includes operating the one or more electrified axles of the electric refuse vehicle to provide braking for the electric refuse vehicle (step 912), according to some embodiments. In some embodiments, step 912 includes operating the electrified axles to provide regenerative braking at a lower rate or lower degree (e.g., less aggressively) than the regenerative braking described in step 812 of process 800. In some embodiments, step 912 includes using a combination of both friction braking and regenerative braking. In some embodiments, step 912 is performed by the control signal generator 614 of the controller 602 and any of the electrified front axle 502a, the electrified rear axles 502b, and/or the brakes 508.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A refuse vehicle comprising:
   a battery;
   a plurality of wheels;
   an electrified axle configured to consume electrical energy from the battery and drive the plurality of wheels to transport the refuse vehicle; and
   a control system comprising processing circuitry configured to:
      transition the refuse vehicle between a collection mode of operation and a highway mode of operation based on a speed of the refuse vehicle or an activation of a lift apparatus of the refuse vehicle; and
      operate the refuse vehicle according to the collection mode of operation or the highway mode of operation, wherein the collection mode of operation and the highway mode of operation comprise different braking settings for the plurality of wheels of the refuse vehicle;
   wherein in the collection mode of operation, the processing circuitry is configured to operate the electrified axle to provide a positive torque to transport the refuse vehicle when a brake pedal is at a position between being fully depressed and fully released.

2. The refuse vehicle of claim 1, wherein the refuse vehicle is a fully electric refuse vehicle configured to use electrical energy provided by the battery to transport the refuse vehicle and to perform one or more refuse collection operations.

3. The refuse vehicle of claim 1, wherein, when the refuse vehicle is in the collection mode of operation, responsive to depression of a brake pedal, the processing circuitry is configured to operate the electrified axle to perform regenerative braking for the plurality of wheels and generate electrical energy for charging of and storage in the battery of the refuse vehicle.

4. The refuse vehicle of claim 1, wherein the processing circuitry is further configured to transition the refuse vehicle into the collection mode of operation in response to a speed of transport of the refuse vehicle being less than a threshold speed, and transition the refuse vehicle into the highway mode of operation in response to the speed of transport of the refuse vehicle being greater than the threshold speed.

5. The refuse vehicle of claim 1, wherein, in the collection mode of operation, the processing circuitry is configured to operate the electrified axle of the refuse vehicle to transport at a baseline speed even when an accelerator pedal of the refuse vehicle is not depressed, wherein the processing circuitry is configured to operate the electrified axle to drive the plurality of wheels to transport the refuse vehicle responsive to depression of the accelerator pedal to achieve a speed greater than the baseline speed.

6. The refuse vehicle of claim 1, wherein:
   in the highway mode of operation, the processing circuitry is configured to use a first relationship between a degree of depression of a brake pedal and an amount of braking provided to the plurality of wheels of the refuse vehicle such that depression of the brake pedal a first amount results in a first amount of braking being provided to the plurality of wheels;
   in the collection mode of operation, the processing circuitry is configured to use a second relationship between the degree of depression of the brake pedal and the amount of braking provided to the plurality of wheels of the refuse vehicle such that depression of the brake pedal the first amount results in a second amount of braking being provided to the plurality of wheels, wherein the first amount of braking and the second amount of braking are different for the depression of the brake pedal the first amount.

7. The refuse vehicle of claim 6, wherein the first amount of braking is less than the second amount of braking.

8. The refuse vehicle of claim 6, wherein the first relationship comprises a first linear relationship and the second relationship comprises a second linear relationship, wherein a slope of the first linear relationship is less than a slope of the second linear relationship.

9. A control system for a refuse vehicle, the control system comprising:
   processing circuitry configured to:
      transition the refuse vehicle between a collection mode of operation and a highway mode of operation based on a speed of transport of the refuse vehicle or an activation of a lift apparatus of the refuse vehicle; and
      operate the refuse vehicle according to the collection mode of operation or the highway mode of operation, wherein the collection mode of operation and the highway mode of operation comprise different braking settings for a plurality of wheels of the refuse vehicle;
   wherein in the collection mode of operation, the processing circuitry is configured to operate an electrified axle to provide a torque to transport the refuse vehicle forward when a brake pedal of the refuse vehicle is at a position between being fully depressed and fully released.

10. The control system of claim 9, wherein the processing circuitry is configured to operate a display screen to provide different user interfaces responsive to the collection mode of operation and the highway mode of operation.

11. The control system of claim 9, wherein the electric motor is a component of an electrified axle, wherein, when the refuse vehicle is in the collection mode of operation, responsive to depression of the brake pedal, the processing circuitry is configured to operate the electrified axle of the refuse vehicle to perform regenerative braking for the plurality of wheels and generate electrical energy for charging of and storage in a battery of the refuse vehicle.

12. The control system of claim 9, wherein the processing circuitry is configured to transition the refuse vehicle into the collection mode of operation in response to the speed of transport of the refuse vehicle being less than a threshold speed, and transition the refuse vehicle into the highway mode of operation in response to the speed of transport of the refuse vehicle being greater than the threshold speed.

13. The control system of claim 9, wherein, in the collection mode of operation, the processing circuitry is configured to operate the electrified axle of the refuse vehicle to transport at a baseline speed even when an accelerator pedal of the refuse vehicle is not depressed, wherein the processing circuitry is configured to operate the electrified axle to drive the plurality of wheels to transport the refuse vehicle responsive to depression of the accelerator pedal to achieve a speed greater than the baseline speed.

14. The control system of claim 9, wherein:
in the highway mode of operation, the processing circuitry is configured to use a first relationship between a degree of depression of a brake pedal and an amount of braking provided to the plurality of wheels of the refuse vehicle such that depression of the brake pedal a first amount results in a first amount of braking being provided to the plurality of wheels;
in the collection mode of operation, the processing circuitry is configured to use a second relationship between the degree of depression of the brake pedal and the amount of braking provided to the plurality of wheels of the refuse vehicle such that depression of the brake pedal the first amount results in a second amount of braking being provided to the plurality of wheels, wherein the first amount of braking and the second amount of braking are different for the depression of the brake pedal the first amount.

15. The control system of claim 14, wherein the first amount of braking is less than the second amount of braking.

16. The control system of claim 14, wherein the first relationship comprises a first linear relationship and the second relationship comprises a second linear relationship, wherein a slope of the first linear relationship is less than a slope of the second linear relationship.

17. A method for controlling a refuse vehicle, the method comprising:
transitioning the refuse vehicle between a collection mode of operation and a highway mode of operation based on a speed of the refuse vehicle or an activation of a lift apparatus of the refuse vehicle; and
operating the refuse vehicle according to the collection mode of operation or the highway mode of operation, wherein the collection mode of operation and the highway mode of operation comprise different braking settings for a plurality of wheels of the refuse vehicle, wherein operating the refuse vehicle according to the collection mode includes operating an electrified axle to provide a positive torque to transport the refuse vehicle when a brake pedal is at a position between being fully depressed and fully released.

18. The method of claim 17, further comprising, in the collection mode of operation, operating an electrified axle of the refuse vehicle to transport the refuse vehicle at a baseline speed even when an accelerator pedal of the refuse vehicle is not depressed, and operating the electrified axle to drive the plurality of wheels to transport the refuse vehicle responsive to depression of the accelerator pedal to achieve a speed greater than the baseline speed.

19. The method of claim 17, further comprising:
in the highway mode of operation:
using a first relationship between a degree of depression of a brake pedal and an amount of braking provided to the plurality of wheels of the refuse vehicle such that depression of the brake pedal a first amount results in a first amount of braking being provided to the plurality of wheels; and
in the collection mode of operation:
using a second relationship between the degree of depression of the brake pedal and the amount of braking provided to the plurality of wheels of the refuse vehicle such that depression of the brake pedal the first amount results in a second amount of braking being provided to the plurality of wheels, wherein the first amount of braking and the second amount of braking are different for the depression of the brake pedal the first amount.

20. The method of claim 19, wherein the first relationship comprises a first linear relationship and the second relationship comprises a second linear relationship, wherein a slope of the first linear relationship is less than a slope of the second linear relationship.

* * * * *